US012776980B2

(12) United States Patent
Chen

(10) Patent No.: US 12,776,980 B2
(45) Date of Patent: Oct. 27, 2026

(54) BORDER GATEWAY PROTOCOL (BGP)—SHORTEST PATH FIRST (SPF) FLOODING REDUCTION

(71) Applicant: HUAWEI TECHNOLOGIES CO., LTD., Shenzhen (CN)

(72) Inventor: Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 18/615,379

(22) Filed: Mar. 25, 2024

(65) Prior Publication Data

US 2024/0259293 A1 Aug. 1, 2024

Related U.S. Application Data

(63) Continuation of application No. PCT/US2022/045381, filed on Sep. 30, 2022.

(60) Provisional application No. 63/250,738, filed on Sep. 30, 2021.

(51) Int. Cl.

*H04L 45/02* (2022.01)
*H04L 45/00* (2022.01)
*H04L 45/12* (2022.01)

(52) U.S. Cl.

CPC .............. *H04L 45/04* (2013.01); *H04L 45/12* (2013.01); *H04L 45/32* (2013.01)

(58) Field of Classification Search

CPC ......... H04L 45/04; H04L 45/50; H04L 45/02; H04L 45/28; H04L 45/42; H04L 45/03; H04L 45/033; H04L 45/74; H04L 45/247; H04L 12/4633; H04L 41/084; H04L 45/00; H04L 45/10; H04L 45/34; H04L 43/10; H04L 45/021; H04L 45/12; H04L 45/22; H04L 45/507; H04L 45/54; H04L 45/32; H04L 45/488; H04L 12/4641; H04L 45/24; H04L 45/64; H04L 45/16; H04L 41/145; H04L 45/66; H04L 41/0873; H04L 41/12; H04L 45/123; H04L 41/122; H04L 41/0866; H04L 41/0894; H04L 45/52;

(Continued)

(56) References Cited

U.S. PATENT DOCUMENTS 9,660,897 B1 * 5/2017 Gredler .................. H04L 45/50
2006/0140136 A1 * 6/2006 Filsfils .................. H04L 45/03 370/255

(Continued)

OTHER PUBLICATIONS

Gredler, Ed., et al., "North-Bound Distribution of Link-State and Traffic Engineering (TE) Information Using BGP," RFC 7752, Mar. 2016, 48 pages.

(Continued)

*Primary Examiner* — Djenane M Bayard
(74) *Attorney, Agent, or Firm* — Conley Rose, P.C.

(57) ABSTRACT

A method for reducing flooding in a Border Gateway Protocol-Shortest Path First (BGP-SPF) domain implemented by a network node. The network node obtains a flooding topology (FT) of the BGP-SPF domain. When there is a link change, the network node transmits Network Layer Reachability Information (NLRI) in a BGP update message indicating the link change to network nodes that are directly connected to the network node on the FT.

19 Claims, 12 Drawing Sheets

(58) Field of Classification Search
CPC ..... H04L 41/06; H04L 41/0895; H04L 41/40; H04L 45/60; H04L 69/40; H04L 12/4625
See application file for complete search history.

(56) References Cited

U.S. PATENT DOCUMENTS

| | | | | |
|---|---|---|---|---|
| 2007/0133406 | A1* | 6/2007 | Vasseur | H04L 45/02 370/230 |
| 2015/0092785 | A1 | 4/2015 | Torvi | |
| 2016/0248658 | A1* | 8/2016 | Patel | H04L 45/488 |
| 2017/0366444 | A1* | 12/2017 | Ansari | H04L 45/033 |
| 2021/0014148 | A1 | 1/2021 | Heitz | |

OTHER PUBLICATIONS

Patel, et al., "BGP Link-State Shortest Path First (SPF) Routing," draft-ietf-Isvr-bgp-sp-16, Feb. 15, 2022, 36 pages.
Rekhter, Ed., et al., A Border Gateway Protocol 4 (BGP-4), RFC 4271, Jan. 2006, 104 pages.

* cited by examiner

BORDER GATEWAY PROTOCOL (BGP)—SHORTEST PATH FIRST (SPF) FLOODING REDUCTION

CROSS REFERENCE TO RELATED APPLICATIONS

This application is a continuation of International Patent Application No. PCT/US2022/045381 filed on Sep. 30, 2022, by Futurewei Technologies, Inc., and titled "Border Gateway Protocol (BGP)-Shortest Path First (SPF) Flooding Reduction," which claims the benefit of U.S. Provisional Patent Application No. 63/250,738 filed on Sep. 30, 2021. The disclosures of the aforementioned applications are hereby incorporated by reference in their entireties.

TECHNICAL FIELD

The present disclosure is generally related to network communications, and specifically to various systems and methods for Border Gateway Protocol (BGP)-Shortest Path First (SPF) Flooding Reduction.

BACKGROUND

The Border Gateway Protocol (BGP) is an inter-Autonomous System (AS) routing protocol that facilitates the exchange of routing information between Autonomous Systems (ASes) for enabling the routing of data packets between ASes. An AS is a set of routers or a connected group of Internet Protocol (IP) networks managed by a single administrative entity such as an Internet service provider (ISP), a large enterprise technology company, a university, or a government agency. In particular, an AS is a collection of one or more associated IP prefixes, referred to as an IP address space of the AS, with a clearly defined routing policy that governs how the AS exchanges routing information with other ASes.

Each AS uses BGP to announce which IP addresses they are responsible for and which other ASes they connect to. BGP routers take all this information from ASes around the world and put it into databases called routing tables to determine the fastest paths from AS to AS. Data packets cross the Internet by hopping from AS to AS until they reach the AS that contains the destination IP address specified by the data packets. For instance, when a data packet arrives at an AS, BGP routers refer to their routing tables to determine which AS the packet should go to next. Routers within the AS that contains the destination IP address send the data packet to a network device corresponding to the destination IP address.

With so many ASes in the world, BGP routers are constantly updating their routing tables. As networks go offline, new networks come online, and ASes expand or contract their IP address space. All of the updated information has to be announced via BGP so that BGP routers can adjust their routing tables.

SUMMARY

A first aspect relates to a method of reducing flooding in the BGP-SPF domain implemented by a network node in a Border Gateway Protocol-Shortest Path First (BGP-SPF) domain. The method includes establishing an external BGP (EBGP) session with a set of route-reflectors (RRs) of the BGP-SPF domain for exchanging routing; determining a link change corresponding to a link of the network node; and sending a BGP Link-State SPF (BGP-LS-SPF) Link Network Layer Reachability Information (NLRI) indicating the link change in a BGP update message over the eBGP session to a subset of the set of RRs according to a flooding behavior that determines which RRs are in the subset of the set of RRs.

Optionally, in a first implementation according to any of the first aspect, the method includes encoding the information indicating the link change in the BGP-LS-SPF Link NLRI; encoding the BGP update message comprising the BGP-LS-SPF Link NLRI; and communicating the BGP update message to the subset of the set of RRs.

Optionally, in a second implementation according to any of the first aspect or any implementation thereof, the method further includes receiving a flooding behavior instructions indicating a flooding behavior that determines which RRs are in the subset of the set of RRs; and configuring the flooding behavior on the network node.

Optionally, in a third implementation according to any of the first aspect or any implementation thereof, the method further includes receiving the flooding behavior instructions from a RR in the set of RRs, wherein the RR is a leader RR in the BGP-SPF domain.

Optionally, in a fourth implementation according to any of the first aspect or any implementation thereof, the method further includes receiving the flooding behavior instructions encoded in a Node Flood Type-Length-Value (TLV); and decoding the Node Flood TLV to determine the flooding behavior.

Optionally, in a fifth implementation according to any of the first aspect or any implementation thereof, the method further includes assigning the network node to a group network nodes in the BGP-SPF domain based on the flooding behavior instructions; and communicating the information indicating the link change to the subset of the set of RRs designated for the group.

A second aspect relates to a method of reducing flooding in the BGP-SPF domain implemented by a RR in a BGP-SPF domain. The method includes establishing an external BGP (EBGP) session with network nodes of the BGP-SPF domain for exchanging routing; configuring a flooding behavior for the network nodes; sending a Node Flood Type-Length-Value (TLV) indicating the flooding behavior in a BGP update message to the network node.

Optionally, in a first implementation according to any of the second aspect, the method includes encoding the flooding behavior in the Node Flood TLV; encoding the BGP update message comprising the Node Flood TLV; and communicating the BGP update message to the network nodes.

Optionally, in a second implementation according to any of the second aspect or any implementation thereof, the method further includes communicating a priority of the RR to become a leader of the BGP-SPF routing domain.

Optionally, in a third implementation according to any of the second aspect or any implementation thereof, the method further includes encoding a priority of the RR to become a leader of the BGP-SPF routing domain in a Leader Priority TLV; encoding a BGP update message comprising the Leader Priority TLV; and communicating the BGP update message to the network nodes and other RRs of the BGP-SPF routing domain.

Optionally, in a fourth implementation according to any of the second aspect or any implementation thereof, the method further includes receiving priorities of the other RRs of the BGP-SPF routing domain to become a leader; determining that the priority of the RR is a highest priority to become a leader of the BGP-SPF routing domain based on the priorities of the other RRs; and configuring the RR as the leader of the BGP-SPF routing domain.

Optionally, in a fifth implementation according to any of the second aspect or any implementation thereof, wherein the flooding behavior instructs the network nodes to send information indicating a link change to only particular RRs of the BGP-SPF routing domain.

A third aspect relates to a method of reducing flooding in a BGP-SPF domain implemented by a network node in the BGP-SPF domain. The method includes obtaining a flooding topology (FT) of the BGP-SPF domain, wherein the FT is a sub-network topology that connects all nodes of a real network topology (RT) of the BGP-SPF domain; determining a link change corresponding to a link of the network node; and sending Network Layer Reachability Information (NLRI) in a BGP update message indicating the link change to network nodes that are directly connected to the network node on the FT.

Optionally, in a first implementation according to any of the third aspect, the method further includes obtaining the FT from a leader node of the node connections BGP-SPF domain.

Optionally, in a second implementation according to any of the third aspect or any implementation thereof, the method further includes receiving a node index mapping from the leader node; and decoding an encoding of the FT using the node index mapping to obtain the FT.

Optionally, in a third implementation according to any of the third aspect or any implementation thereof, the method further includes receiving updates to the FT from the leader node; and modifying the FT based on the updates.

Optionally, in a fourth implementation according to any of the third aspect or any implementation thereof, wherein the updates comprise new connections encoded in a Paths TLV that is encoded in a Multiprotocol Reachable Link Network Layer Reachability Information (MP_REACH_NLRI) path attribute in a BGP update message.

Optionally, in a fifth implementation according to any of the third aspect or any implementation thereof, wherein the updates comprise removed connections encoded in a Paths TLV that is encoded in a Multiprotocol UnReachable Link Network Layer Reachability Information (MP_REACH_NLRI) path attribute in a BGP update message.

A fourth aspect relates to a method for computing a flooding topology (FT) implemented by a network device. The method includes selecting a node R0 from a network; initializing the FT with a node element for the node R0, wherein the node element comprises a node, a number of node connections (D), a previous hops (PHs) list; initializing a candidate queue (Cq) comprising node elements for each node directly connected to the node R0 on the network; implementing a first loop of the method comprising: removing the node element of a first node from the Cq and appending the node element to the FT, wherein the first node has a D less than a maximum number of connections (MaxD); determining whether the FT includes all nodes in the network; identifying a set of nodes connected to the first node in the network that are not in the FT when the FT does not include all the nodes in the network, and appending nodes in the set of nodes that are not in Cq to the Cq, and appending the first node to a previous hops (PHs) list of the node element of nodes in the set of nodes that are in Cq, and repeating the first loop; and terminating the first loop when the FT includes all the nodes in the network; and adding a link to any node in the FT that has the D equal to one (1).

Optionally, in a first implementation according to any of the fourth aspect, wherein the first loop of the method determines that FT does not include all nodes in the network when the Cq is not empty, and determines that the FT includes all nodes in the network when the Cq is empty.

Optionally, in a second implementation according to any of the fourth aspect or any implementation thereof, wherein adding the link to any node in the FT that has the D equal to one (1) in the FT comprises implementing a second loop, wherein the second loop includes: identifying a single link node in the FT, wherein the single link node has the D equal to one (1) in the FT; terminating the second loop when there is no single link node in the FT; otherwise, identifying a set of links connected to the single link node in the network, wherein the set of links excludes an existing link of the single link node on the FT; identifying a set of remote nodes connected to the set of links; identifying a set of transit capable remote nodes in the set of remote nodes that can support transit; identifying a second link in the set of links connected to a transit capable remote node in the set of transit capable remote nodes that has a minimum D and a minimum node identifier (ID); identify the second link attached in the set of links connected to a remote node in the set of remote nodes that has a minimum D and a minimum node ID when there is no transit capable remote node in the set of transit capable remote nodes; adding the second link into the FT; increasing the D of the single link node in the FT by one; increasing the D of the transit capable remote node or the remote node, when there is no transit capable remote node, in the FT by one; and repeating the second loop.

Optionally, in a third implementation according to any of the fourth aspect or any implementation thereof, wherein the node R0 has a lowest node identifier (ID) in the network.

Optionally, in a fourth implementation according to any of the fourth aspect or any implementation thereof, wherein the Cq is initialized with nodes ordered from lowest node ID to highest node ID.

Optionally, in a fifth implementation according to any of the fourth aspect or any implementation thereof, wherein nodes appended to the Cq are ordered from lowest node ID to highest node ID.

A fifth aspect relates to network node that includes at least a processor and a memory storing instructions, wherein the instructions when executed by the processor causes the network node to perform the method according to any of the preceding aspects or implementation thereof.

A sixth aspect relates to computer program product comprising computer-executable instructions that are stored on a non-transitory computer-readable medium and that, when executed by a processor of a device, cause the device to perform the method according to any of the preceding aspects or implementation thereof.

For the purpose of clarity, any one of the foregoing embodiments may be combined with any one or more of the other foregoing embodiments to create a new embodiment within the scope of the present disclosure.

These and other features, and the advantages thereof, will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
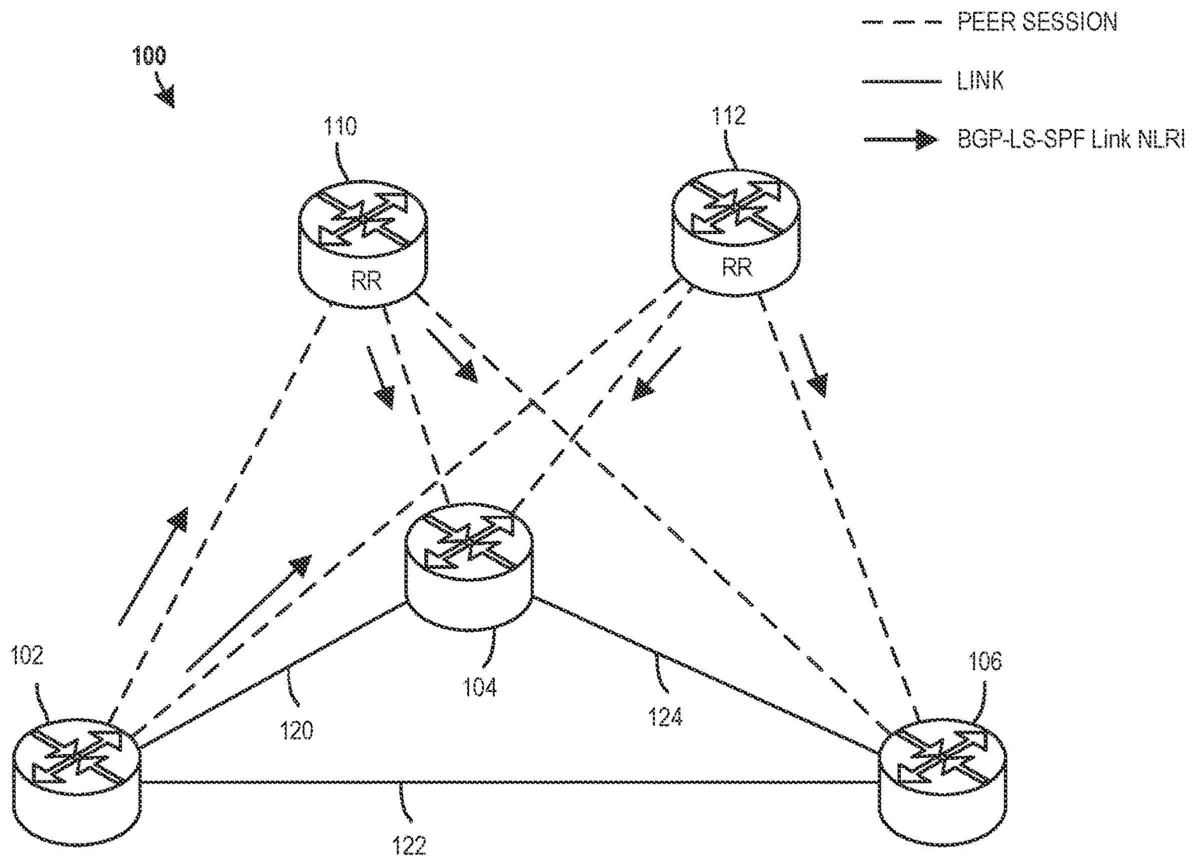
FIG. 1 is a schematic diagram illustrating BGP-SPF flooding under a route-reflector RR model.

It should be understood at the outset that although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for reducing flooding in a BGP-SPF routing domain. Flooding refers to the process of communicating, also commonly referred to as advertising, link state or routing information within a domain to ensure that all routers within the domain converge on the same network topological information within a finite period of time. A network topology is the physical and logical arrangement of nodes and connections or links in a network. A link is a communication channel that connects two devices for the purpose of data transmission. A BGP-SPF routing domain, or BGP-SPF domain, is a set of BGP-SPF nodes that are under a single administrative domain and exchange link-state information (also referred to as routing information) using a BGP Link-State SPF (BGP-LS-SPF) Link Network Layer Reachability Information (NLRI). A BGP-LS-SPF Link NLRI is a Link NLRI that uses the Subsequent Address Family Identifiers (SAFI) assigned to BGP-LS-SPF. A Link NLRI is an encoding format for providing network layer reachability information such as information that describes links, nodes, and prefixes comprising link-state information. The BGP-LS-SPF Link NLRI is used for determining routing paths in a BGP-SPF routing domain.

A BGP-SPF node is a network device (e.g., a router) that implements BGP-SPF. BGP-SPF is an extension to BGP that leverages BGP Link-State (BGP-LS). BGP-LS is an extension to BGP defined in Internet Engineering Task Force (IETF) document Request for Comment (RFC) 7752 entitled "North-Bound Distribution of Link-State and Traffic Engineering (TE) Information Using BGP" by H. Gredler, et al., published March 2016. BGP-LS is used to share interior gateway protocol (IGP) link-state network topology information of an AS with external components (e.g., external servers) using BGP. For example, as previously stated, BGP-SPF uses BGP-LS-SPF Link NLRI to exchange routing information. The BGP-LS-SPF Link NLRI reuses the LS NLRI format and an Address Family Identifier (AFI) of BGP-LS (AFI 16388). However, instead of using the SAFI assigned to BGP-LS (SAFI 71), BGP-SPF uses SAFI 80 assigned to BGP-LS-SPF to indicate that the Link NLRI is a BGP-LS-SPF Link NLRI used for BGP-SPF route computation. All the TLVs used in BGP-LS AFI are applicable and used for the BGP-LS-SPF SAFI. In addition, in contrast to BGP, BGP-SPF replaces the existing BGP route selection decision process based on a Path Vector algorithm as described in IETF document RFC 4271 entitled "A Border Gateway Protocol 4 (BGP-4)" by Y. Rekhter, et al., published January 2006 with an SPF-based route selection process based on an SPF algorithm such as the Dijkstra algorithm that computes the shortest path from a given node in a graph to every other node in the graph. Additional information on BGP-SPF routing is described in the IETF document entitled "BGP Link-State Shortest Path First (SPF) Routing" by K. Patel, et al., published Feb. 15, 2022 (draft-ietf-lsvr-bgp-spf-16).

FIG. 1 is a schematic diagram illustrating an existing flooding process for a BGP-SPF routing domain 100 that implements a route-reflector (RR) or controller network topology. The RR or controller network topology is also referred to as a RR peering model, a RR model, or a sparse peering model. Under the RR peering model, BGP speakers peer solely with one or more RRs or controllers over external BGP (EBGP) sessions. A BGP speaker is a router that advertises routing information using BGP. As stated above, in a BGP-SPF routing domain, BGP speakers advertise routing information using the BGP-LS-SPF Link NLRI. Thus, BGP speakers in a BGP-SPF routing domain may also be referred to as BGP-LS-SPF speakers. For instance, in an embodiment, all BGP-LS-SPF speakers in a BGP-SPF routing domain exchange BGP-LS-SPF Link NLRI, run an SPF calculation, and update their routing table accordingly.

An RR is a designated router configured to distribute/reflect routing information among BGP peers. BGP peers are BGP speakers configured to exchange routing information. For instance, a RR may receive routing information from a first BGP peer and reflect/distribute the routing information to other BGP peers. By using RRs, the RR peering model allows for fewer BGP peer sessions and, consequently, fewer instances of the same NLRI being received from multiple BGP peers. A BGP-SPF routing domain may include any number of BGP peers and RRs. For instance, a BGP-SPF routing domain may have multiple RRs in case one of the RRs malfunctions.

As a nonlimiting example, in FIG. 1, the BGP-SPF routing domain 100 includes 3 BGP peers (node 102, node 104, and node 106) and 2 RRs (RR 110 and RR 112). Node 102, node 104, and node 106 are each configured as a BGP-LS-SPF speaker. In the depicted embodiment, node 102, node 104, and node 106 each establish a peer session with both RR 110 and RR 112 (as indicated by the dotted lines in FIG. 1). There is a link 120 between node 102 and node 104, a link 122 between node 102 and node 106, and a link 124 between node 104 and node 106.

In the depicted embodiment, when there is a link change, a BGP-LS-SPF speaker sends/advertises a BGP-LS-SPF Link NLRI in a BGP update message to indicate the link change to the RR 110 and the RR 112. BGP update messages are messages that carry routing information and are used for exchanging routing information between BGP neighbors. A link change is any change that affects routing information. For example, a link change occurs when a new link is established/up or when a previously established link is withdrawn/down. After receiving the BGP-LS-SPF Link NLRI, the RR 110 and the RR 112 send the BGP-LS-SPF Link NLRI in a BGP update message to the other nodes that peer with the RR 110 and the RR 112. For example, assume that node 102 detects that the link 122 to node 106 is down. Node 102 sends a BGP-LS-SPF Link NLRI indicating the link change in a BGP update message to both the RR 110 and the RR 112 as indicated by the arrows. After receiving the BGP-LS-SPF Link NLRI from node 102, both RR 110 and RR 112 sends the BGP-LS-SPF Link NLRI to node 104 and node 106. Thus, both node 104 and node 106 receive two copies of the same BGP-LS-SPF Link NLRI, one from RR 110 and the other from RR 112. The second copy of the BGP-LS-SPF Link NLRI is not needed. Therefore, the existing flooding process for a BGP-SPF routing domain under the RR peering model is inefficient.

Figure 2:
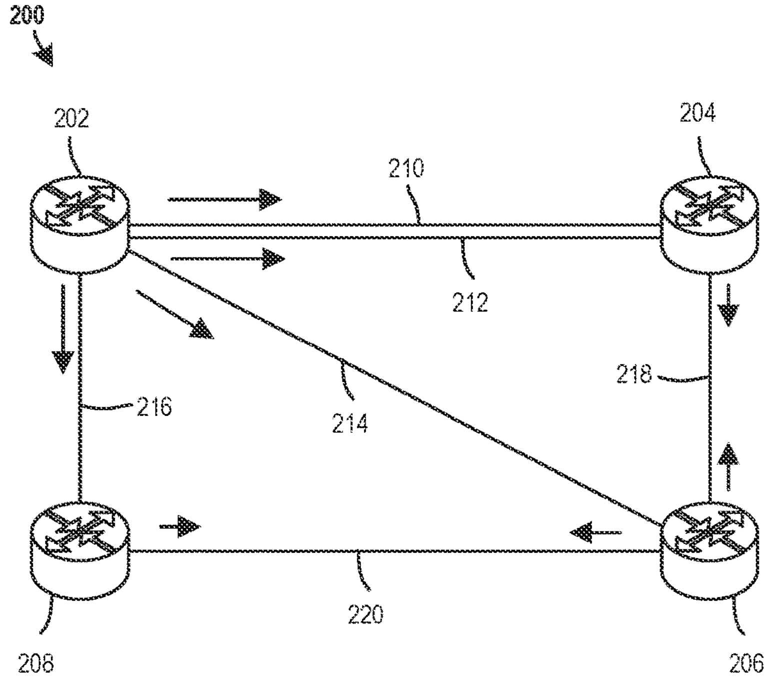
FIG. 2 is a schematic diagram illustrating BGP-SPF flooding under a node connections model.

FIG. 2 is a schematic diagram illustrating an existing flooding process for a BGP-SPF routing domain 200. The BGP-SPF routing domain 200 is a node connections BGP-SPF routing domain. A node connections BGP-SPF routing domain, or node connections BGP-SPF domain, as referenced herein is a BGP-SPF routing domain that implements a node connections network topology or node connections model as described in the present disclosure. The BGP-SPF routing domain 200 includes 4 BGP peers (node 202, node 204, node 206, and node 208) each configured as a BGP-LS-SPF speaker. In the node connections model, external BGP (EBGP) single-hop sessions are established over direct point-to-point links interconnecting the nodes in the BGP-SPF routing domain 200. EBGP is used to connect nodes located in different ASes. Once the single-hop BGP session has been established and the BGP-LS-SPF AFI/SAFI capability has been exchanged for the corresponding session, the link is considered up from a BGP SPF perspective. The corresponding BGP-LS-SPF Link NLRI is then advertised to all the nodes in the BGP-SPF routing domain 200 through all the BGP sessions over the links. If the session goes down, the corresponding BGP-LS-SPF Link NLRI will be withdrawn. The withdrawal is done through advertising a BGP update containing the BGP-LS-SPF Link NLRI encoded in a Multiprotocol Unreachable NLRI (MP_UNREACH_NLRI) path attribute to all the nodes in the BGP-SPF routing domain 200 using all BGP sessions over the links.

As a nonlimiting example, in FIG. 2, node 202, node 204, node 206, and node 208 are connected by six links. There are two parallel links, link 210 and link 212, between node 202 and node 204, a link 214 between node 202 and node 206, a link 216 between node 202 and node 208, a link 218 between node 204 and node 206, and a 220 link between node 206 and node 208. Assume that the EBGP sessions over all the above links have been established and the BGP-LS-SPF AFI/SAFI capability has been exchanged for the corresponding sessions, except for the EBGP session over the link 216 between node 202 and node 208. When the EBGP session over the link 216 is established and the BGP-LS-SPF AFI/SAFI capability is exchanged for the corresponding session, node 202 determines that the link 216 is up. Node 202 then sends the BGP-LS-SPF Link NLRI for the link 216 to node 204, node 206 and node 208 (as indicated by the arrows in FIG. 2) through its EBGP sessions (i.e., the EBGP session between node 202 and node 204 over link 210, the EBGP session between node 202 and node 204 over link 212, the EBGP session between node 202 and node 206 over the link 220, and the EBGP session between node 202 and node 208 over the 216). After receiving the BGP-LS-SPF Link NLRI from node 202, the node 204, node 206, and node 208 each send the BGP-LS-SPF Link NLRI to the other nodes that have EBGP sessions with the node. For instance, node 204 sends the BGP-LS-SPF Link NLRI to node 206. Node 206 sends the BGP-LS-SPF Link NLRI to node 204 and node 208. Node 208 sends the BGP-LS-SPF Link NLRI to node 206.

Similarly, when the EBGP session over the link 216 is established and the BGP-LS-SPF AFI/SAFI capability is exchanged for the corresponding session, node 208 considers link 216 up and sends the BGP-LS-SPF Link NLRI for the link 216 through the EBGP sessions of node 208 (i.e., the session between node 208 and node 206 over the link 220, and the session between node 208 and node 202 over the link 216) to nodes node 206 and node 202. For simplicity reasons, arrows for messages initiated by node 208 are not shown in FIG. 2. After receiving the NLRI from node 208, node 202 and node 206 each sends the BGP-LS-SPF Link NLRI to the other nodes that have EBGP sessions with the node (i.e., node 206 sends the BGP-LS-SPF Link NLRI to nodes node 202 and node 204, node 202 sends the BGP-LS-SPF Link NLRI to node 204 and node 206 through two parallel EBGP sessions to node 204 and the EBGP session to node 206).

As shown above, in the BGP-SPF routing domain 200, each of the nodes receives several redundant BGP-LS-SPF Link NLRIs when there is a link change. Therefore, the existing flooding process for a node connections BGP-SPF routing domain is inefficient.

Similarly, in a BGP-SPF routing domain that implements a directly-connected nodes model (referred to herein as a directly-connected nodes BGP-SPF routing domain), where each node is directly-connected to all the other nodes (not illustrated), the sessions may be between loopback addresses (i.e., two-hop sessions). As a result, there will be a single EBGP session even when there are multiple direct connections between nodes. BGP-LS-SPF Link NLRI is advertised as long as an EBGP session has been established and the BGP-LS-SPF AFI/SAFI capability has been exchanged. In comparison to the node connections model, because there are EBGP sessions between every directly-connected node in the directly-connected nodes BGP-SPF routing domain, there is only a reduction in EBGP sessions when there are parallel links between nodes. Thus, the existing flooding process for a directly-connected nodes BGP-SPF routing domain is also inefficient.

Figure 3:
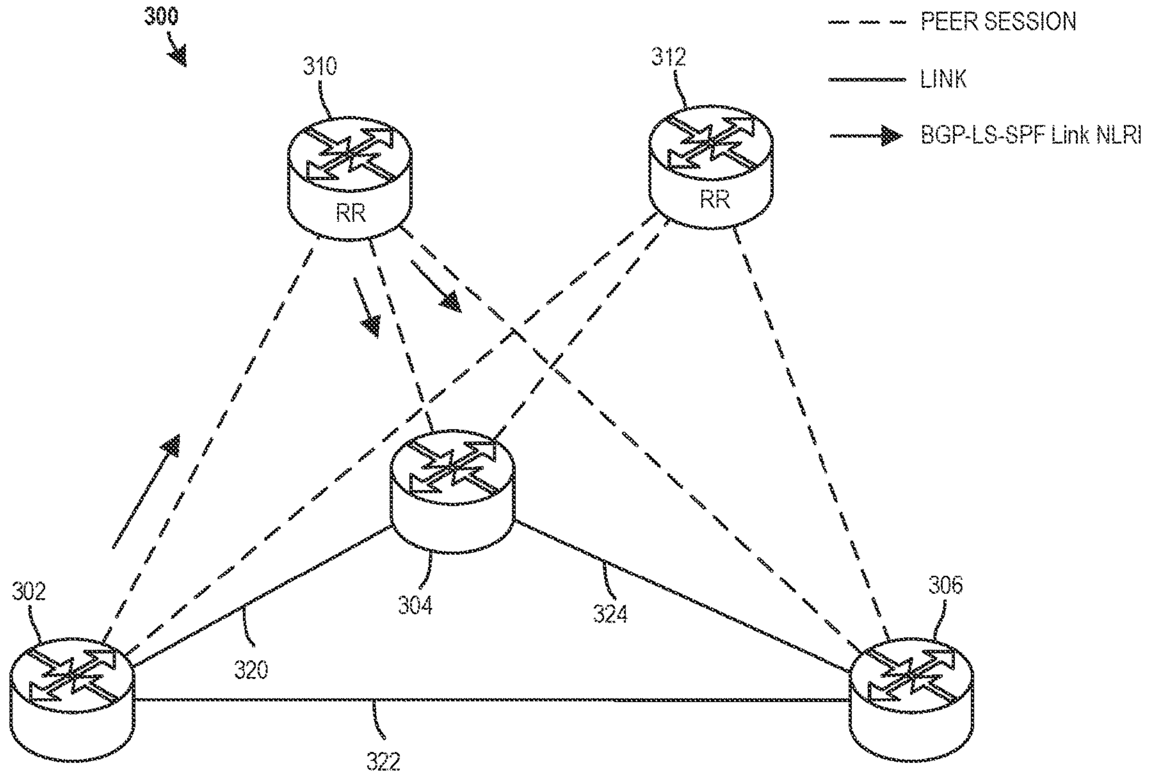
FIG. 3 is a schematic diagram illustrating BGP-SPF flooding reduction under a RR model in accordance with an embodiment of the present disclosure.

FIG. 3 is a schematic diagram illustrating a reduce flooding process for a BGP-SPF routing domain 300 that implements a RR network topology in accordance with an embodiment of the present disclosure. The routing domain 300 is similar to the routing domain 100 in FIG. 1 in that node 302, node 304, and node 306 are each configured as a BGP-LS-SPF speaker, and each establish a peer session with both RR 310 and RR 312 (as indicated by the dotted lines in FIG. 3). There is a link 320 between node 302 and node 304, a link 322 between node 302 and node 306, and a link 324 between node 304 and node 306.

In accordance with an embodiment, when a node determines that there is a link change, the node is configured to send a BGP-LS-SPF Link NLRI indicating the link change in a BGP update message to a subset (i.e., some, but not all) of the RRs that node peers with. After receiving the BGP-LS-SPF Link NLRI, the RR or controller sends the BGP-LS-SPF Link NLRI to the other nodes/BGP-LS-SPF speakers that peer with the RR or controller.

In some embodiments, the flooding behavior for each node is configured on the node. For example, in some embodiments, the number of RRs that the node sends the BGP-LS-SPF Link NLRI to may be user configurable (e.g., configured by a network administrator). Alternatively, in some embodiments, the node is configured to send the BGP-LS-SPF Link NLRI to half or some other percentage of the RRs that node peers with, or to just one RR that the node peers with. In some embodiments, the particular RRs that the node sends the BGP-LS-SPF Link NLRI to may be user configurable or may be selected at random. For example, the node may be configured to randomly select half of the RRs that the node peers with to send a BGP-LS-SPF Link NLRI indicating a link change. Still, in various embodiments, including embodiments described in FIG. 4 and FIG. 5, under the RR model, the flooding behavior for every node is configured on a RR or controller such as the leader RR and the leader RR advertises the behavior to the other RRs and every node in the network or a BGP-SPF routing domain (e.g., using a Node Flood TLV as described in FIG. 9). In some embodiments, a particular RR may be elected as a leader RR based on a priority of the RR to become a leader. In an embodiment, the priority of a RR to become leader is assigned by a network administrator. In an embodiment, RRs advertise their priority to become leader to other RRs and network nodes in the BGP-SPF routing domain. In an embodiment, a RR with the highest advertised priority to become a leader in the BGP-SPF routing domain becomes the leader RR. In other words, if a RR compares the advertised priority of the RR to the advertised priority of other RRs and determines that the RR has the highest advertised priority, then the RR configures itself as the leader. Similarly, the nodes in the BGP-SPF routing domain can determine whether a RR is a leader RR based on the priorities advertised by the RRs when receiving a flooding behavior instruction from a RR. In some embodiments, the priority of a RR to become a leader in the BGP-SPF routing domain is advertised by the RR (e.g., using a Leader Priority TLV as described in FIG. 8). In an embodiment, when there are more than one of the RRs that have the same highest priority to become a leader, the RR with the highest Node identifier (ID) and the highest priority is the elected the leader RR in the BGP-SPF routing domain. As stated above, the leader RR can then instruct the nodes in the BGP-SPF routing domain where to send a BGP-LS-SPF Link NLRI indicating a link change (e.g., which RR or RRs of the BGP-SPF routing domain to send the BGP-LS-SPF Link NLRI). In some embodiments, the leader RR can provide different instructions regarding the sending of a BGP-LS-SPF Link NLRI to different nodes in the BGP-SPF routing domain (e.g., some nodes may be instructed to flood link states of the nodes to a particular RR, and other nodes may be instructed to flood link states of the nodes to a different RR or to multiple RRs).

As a nonlimiting example, in FIG. 3, assume that node 302 discovers that the link 322 to node 306 is down. Node 302 sends a BGP-LS-SPF Link NLRI indicating the link change in a BGP update message to just RR 310 as indicated by the arrow. After receiving the BGP-LS-SPF Link NLRI from node 302, RR 310 sends the BGP-LS-SPF Link NLRI to node 304 and node 306. Thus, both node 304 and node 306 receive just one copy of the BGP-LS-SPF Link NLRI, and do not receive any redundant copies of the same BGP-LS-SPF Link NLRI. Thus, compared to the existing flooding process described in FIG. 1, the reduce flooding process in FIG. 3 reduces the amount of flooding in a BGP-SPF routing domain by half.

Figure 4:
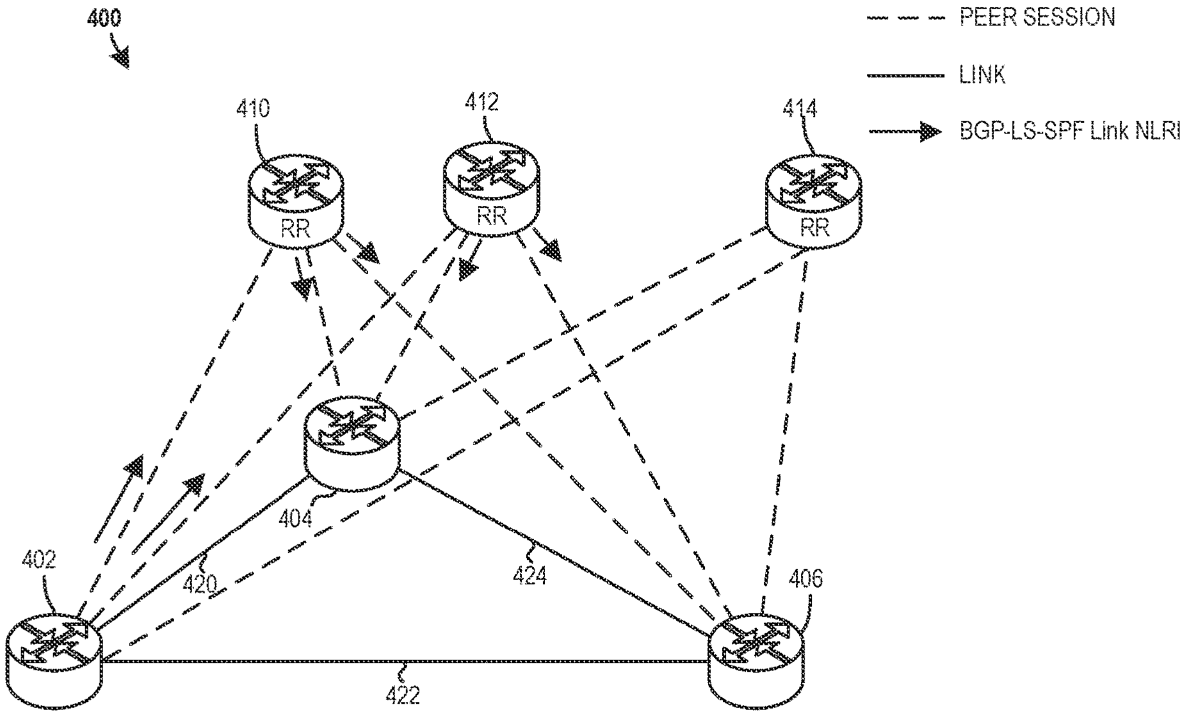
FIG. 4 is a schematic diagram illustrating BGP-SPF flooding reduction under a RR model in accordance with another embodiment of the present disclosure.

FIG. 4 is a schematic diagram illustrating a reduce flooding process for a BGP-SPF routing domain 400 that implements a RR network topology in accordance with an embodiment of the present disclosure. The routing domain 400 includes node 402, node 404, and node 406 that are each configured as a BGP-LS-SPF speaker. Node 402, node 404, and node 406 each establish a peer session with RR 410, RR 412, and RR 414 (as indicated by the dotted lines in FIG. 4). There is a link 420 between node 402 and node 404, a link 422 between node 402 and node 406, and a link 424 between node 404 and node 406.

In this embodiment, every node in the routing domain 400 is configured to send a BGP-LS-SPF Link NLRI indicating a link change in a BGP update message to the same two RRs in the routing domain 400 for providing redundancy in case one of the RR fails. For example, node 402, node 404, and node 406 each are configured to send a BGP-LS-SPF Link NLRI indicating a link change in a BGP update message to RR 410 and RR 412. For instance, assume that node 402 discovers that the link 422 to node 406 is down. Node 402 sends a BGP-LS-SPF Link NLRI indicating the link change in a BGP update message to RR 410 and RR 412 as indicated by the arrow. After receiving the BGP-LS-SPF Link NLRI from node 402, RR 410 and RR 412 send the BGP-LS-SPF Link NLRI to node 404 and node 406. Thus, both node 404 and node 406 receive two copies of the BGP-LS-SPF Link NLRI, one as a redundancy backup. Even though the nodes receive a redundant copy of the BGP-LS-SPF Link NLRI in this embodiment, when compared to the existing flooding process described in FIG. 1, the reduce flooding process in FIG. 4 reduces the amount of flooding in a BGP-SPF routing domain by one-third.

Figure 5:
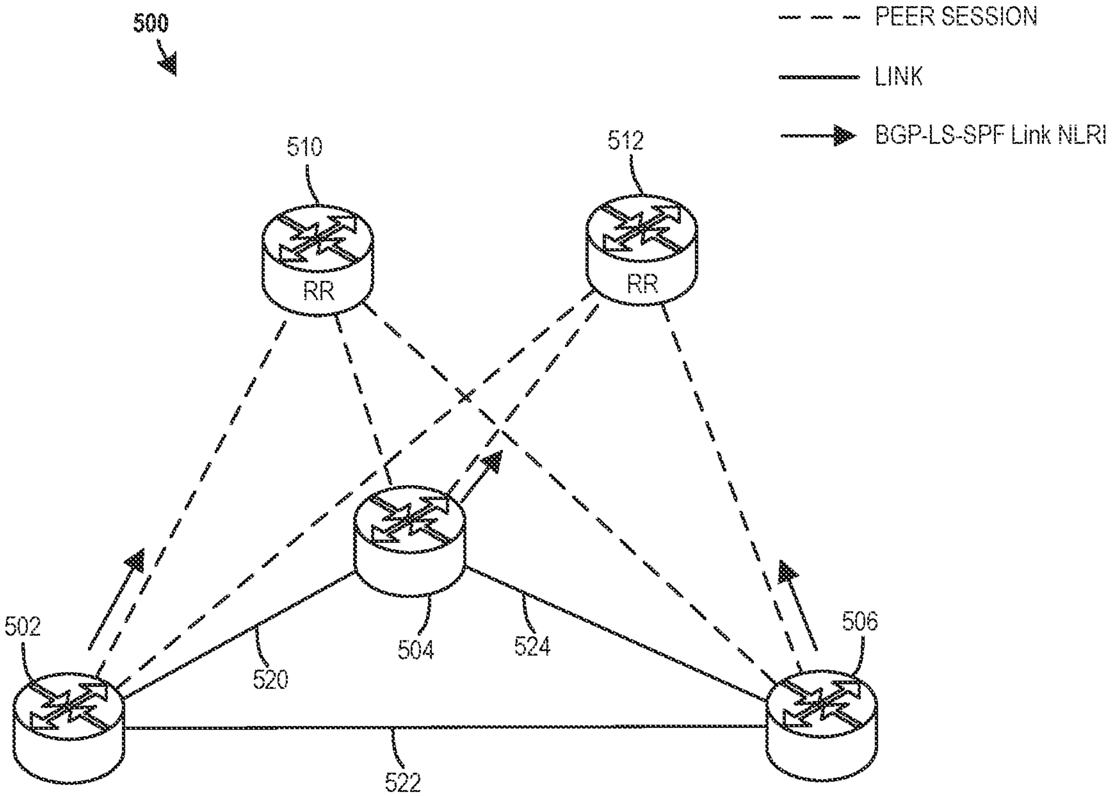
FIG. 5 is a schematic diagram illustrating BGP-SPF flooding reduction under a RR model in accordance with another embodiment of the present disclosure.

FIG. 5 is a schematic diagram illustrating a reduce flooding process for a BGP-SPF routing domain 500 that implements a RR network topology in accordance with an embodiment of the present disclosure. The routing domain

500 is similar to the routing domain 100 in FIG. 1. The routing domain 500 includes node 502, node 504, and node 506 that are each configured as a BGP-LS-SPF speaker. Node 502, node 504, and node 506 each establish a peer session with RR 510 and RR 512 (as indicated by the dotted lines in FIG. 5). There is a link 520 between node 502 and node 504, a link 522 between node 502 and node 506, and a link 524 between node 504 and node 506.

In this embodiment, the nodes in the routing domain 500 may be evenly divided, or as close to being evenly divided as possible, into a number of groups. The number of groups may be equal to the number of RRs in a routing domain (i.e., providing an optimum load-balancing approach where every group of nodes has about the same number of nodes as each of the other groups, the workload is balanced among the RRs in the routing domain). Alternatively, the number of groups may be less than the number of RRs in a routing domain (i.e., not every RR in the routing domain will be used to reflect the BGP-LS-SPF Link NLRI). The selection of which nodes belong to which group may be random or may be based on one or more factors (e.g., distance between a node and a RR, node identifiers (IDs), or other factors). For example, in one implementation, the nodes (supposing there are M nodes in total) are divided into N groups through ordering of the nodes by the node ID of the nodes in ascending order and grouping the nodes. Each of the N groups has M/N nodes. The first M/N nodes in the ordered nodes are in the first group; the M/N nodes according to their node IDs following the first group are in the second group; the M/N nodes according to their node IDs following the second group are in the third group; and so on. The nodes following the second to last group are in the Nth group (i.e., the last group). The nodes in each group are then configured to send a BGP-LS-SPF Link NLRI indicating a link change in a BGP update message to a particular RR assigned to the group when a link change occurs. Thus, a first group of nodes sends their BGP-LS-SPF Link NLRIs to a first RR; a second group of nodes sends their BGP-LS-SPF Link NLRIs to a second RR; and so on. After receiving a BGP-LS-SPF Link NLRI from a node, a RR sends the BGP-LS-SPF Link NLRI to the other nodes in the BGP-SPF routing domain.

For example, assume node 502, node 504, and node 506 are divided into two groups, with node 502 in a first group, and node 504 and node 506 in a second group. Node 502 in the first group is configured to send BGP-LS-SPF Link NLRIs to RR 510 when a link change occurs, and node 504 and node 506 in the second group are configured to send BGP-LS-SPF Link NLRIs to RR 512 when a link change occurs (as shown by the arrow in FIG. 5). After RR 510 receives a BGP-LS-SPF Link NLRI from node 502, RR 510 sends the BGP-LS-SPF Link NLRI to node 504 and node 506. After RR 512 receives a BGP-LS-SPF Link NLRI from node 504, RR 512 sends the BGP-LS-SPF Link NLRI to node 502 and node 506. Similarly, after RR 512 receives a BGP-LS-SPF Link NLRI from node 506, RR 512 sends the BGP-LS-SPF Link NLRI to node 502 and node 504. Thus, each of the other nodes receives only one copy of the same NLRI, which is from RR 510 or RR 512. There is no redundant copy of the same NLRI. Therefore, this embodiment, similar to the embodiment in FIG. 3, when compared to the existing flooding process described in FIG. 1, reduces the amount of flooding in a BGP-SPF routing domain by half, while also balancing the workload between the RRs of a BGP-SPF routing domain.

Figure 6A:
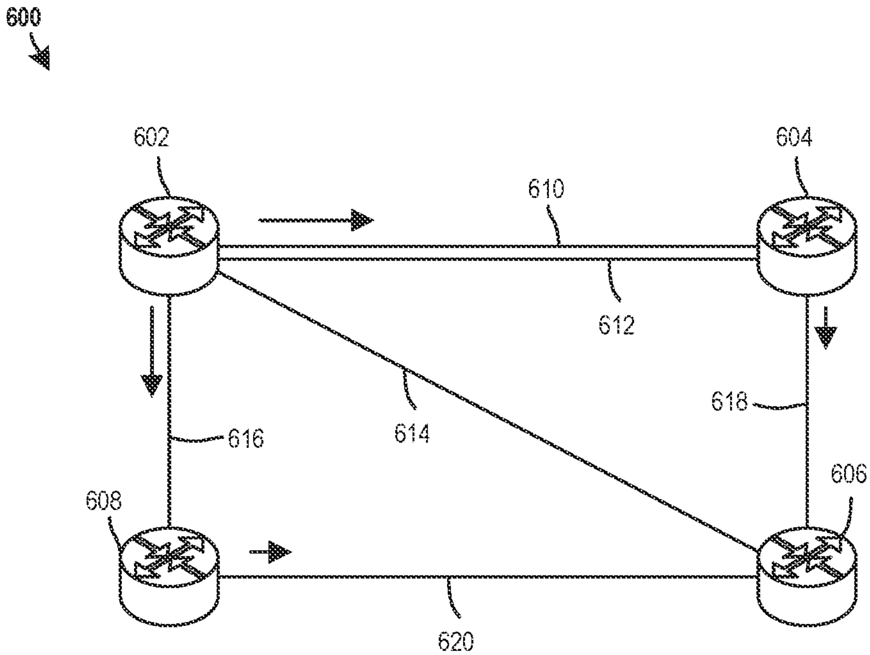
FIG. 6A is a schematic diagram illustrating BGP-SPF flooding reduction node connections model in accordance with an embodiment of the present disclosure.
Figure 6B:
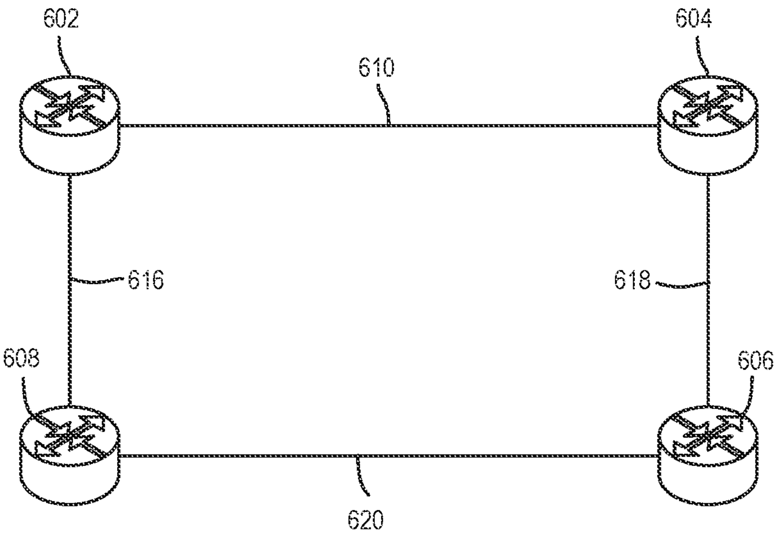
FIG. 6B is a schematic diagram illustrating an FT for the BGP-SPF flooding reduction node connections model in FIG. 6A.

FIG. 6A is a schematic diagram illustrating a reduce flooding process for a BGP-SPF routing domain 600 in accordance with an embodiment of the present disclosure. The BGP-SPF routing domain 600 is a node connections BGP-SPF routing domain similar to the BGP-SPF routing domain 200 in FIG. 2. The BGP-SPF routing domain 600 includes 4 BGP peers (node 602, node 604, node 606, and node 608) each configured as a BGP-LS-SPF speaker, and are similarly connected by six links 610-620 as described in FIG. 2. However, in contrast to the existing flooding process described in FIG. 2, where a node sends a BGP-LS-SPF Link NLRI to all other nodes that have EBGP sessions with the node when a link change occurs and the receiving node sends the BGP-LS-SPF Link NLRI to all other nodes that have EBGP sessions with the receiving node, which results in numerous redundant copies of the same BGP-LS-SPF Link NLRI being transmitted during the existing flooding process, each of the nodes in the BGP-SPF routing domain 600 obtains a Flooding Topology (FT) of the BGP-SPF routing domain 600. A FT is a sub-network topology of a real network topology (RT) that connects all the nodes in the RT. For example, FIG. 6B illustrates an FT of the RT of the BGP-SPF routing domain 600 in FIG. 6A. As shown in FIG. 6B, the FT is a sub-network topology (i.e., includes only some of the links (links 610, 616, 618, and 620) of the RT of the BGP-SPF routing domain 600 in FIG. 6A) that connects all the nodes (nodes 602, 604, 606, and 608) in the RT. There may be more than one of the sub-network topologies that meet the requirements of being an FT of a RT. In an embodiment, the FT is computed in a distributed mode, where every BGP-LS-SPF speaker in the BGP-SPF routing domain 600 computes an FT for the BGP-SPF routing domain 600 using the same algorithm. An example algorithm for computing an FT for the BGP-SPF routing domain 600 is described in FIG. 7. In another embodiment, the FT is computed in a centralized mode, where one node (i.e., BGP-LS-SPF speaker) in the BGP-SPF routing domain 600 is elected as a leader node and computes an FT for the BGP-SPF routing domain 600. The leader node then advertises the FT to every node in the BGP-SPF routing domain 600. Whenever the leader node determines that there is a change in the RT of the BGP-SPF routing domain 600, the leader node computes an updated FT for the BGP-SPF routing domain 600 and advertises only the changes between the advertised FT and the updated FT to every node in the BGP-SPF routing domain 600. If there are changes in the mappings between all the node IDs and their indexes, the leader advertises the changes in the mappings between all the node IDs and their indexes to every node in the BGP-SPF routing domain 600 using node IDs TLVs (as described in FIG. 12). For example, in an embodiment, for the new nodes added into the BGP-SPF routing domain 600, the leader advertises the mappings between the IDs of the new nodes and their indexes using the node IDs TLVs encoded in a Multiprotocol Reachable NLRI (MP_REACH_NLRI) path attribute in a BGP update message to add the mappings. For the dead nodes removed from the BGP-SPF routing domain 600, the leader advertises the mappings between the IDs of the dead nodes and their indexes using the node IDs TLVs under the MP_UNREACH_NLRI path attribute in a BGP update message to withdraw the mappings. For new connections/links added into the current FT, the leader advertises the new connections/links using the paths TLVs (as described in FIG. 13) under a MP_REACH_NLRI path attribute in a BGP update message to add the new connections/inks to the current FT. For the old connections/links removed from the current FT, the leader advertises the old connections/links using the paths TLVs under the MP_UNREACH_NLRI path attribute in a BGP update message to withdraw the old connections/links from the current FT.

In the event that a leader node fails (i.e., is not working correctly), a new leader is elected based on a priority of the node for becoming a leader as further described below. In an embodiment, in centralized mode, the new leader computes a new FT for the BGP-SPF routing domain 600 and advertises the new FT to every node in the BGP-SPF routing domain 600. Because this is a new FT, as opposed to an updated FT, the new leader also advertises the mappings between all the nodes and their indexes (as described in FIG. 12) and every connection/link on the FT (as described in FIG. 14) to every node in the domain. Alternatively, in some embodiments, the new leader advertises to every node in the domain the first (new) FT computed by the new leader as an updated FT to the current FT that the new leader previously received from the old leader. That is, the new leader instructs every node in the BGP-SPF routing domain 600 to add the new connections/links to the current FT and remove/withdraw old connections/links from the current FT based on the new FT computed by the new leader. These new connections/links are on the new FT, but not on the current FT. Similarly, the old connections/links are on the current FT, but not on the new FT.

Once each of the nodes in the BGP-SPF routing domain 600 obtains an FT of the BGP-SPF routing domain 600, either by computing the FT or by receiving the FT from another node, when a node detects a link change (e.g., a link is up or down), the node sends a BGP-LS-SPF Link NLRI in a BGP update message indicating the link change to peer nodes on the FT (i.e., a peer node is a node or nodes that are directly connected to the node by a link on the FT). A peer node that receives the BGP-LS-SPF Link NLRI in the BGP update message from the node is configured to send the BGP-LS-SPF Link NLRI in a BGP update message to other peer nodes of the peer node on the FT (i.e., exclude peer node(s) on FT that sent the BGP-LS-SPF Link NLRI to the node). For example, assume that node 602 determines that link 616 is up. In response to the link change, node 602 determines, according to the FT in FIG. 6B, that nodes 604 and node 608 are directly connected to node 602 by link 610 and link 616, respectively, on the FT. Therefore, node 602 sends a BGP-LS-SPF Link NLRI indicating the link change for link 616 in a BGP update message, as indicated by the arrows in FIG. 6A, to node 604 through the EBGP session between node 602 and node 604 over link 610, and to node 608 through the EBGP session between node 602 and node 608 over link 616. Note that in contrast to the existing flooding process described in FIG. 2, node 602 does not send the a BGP-LS-SPF Link NLRI indicating the link change for link 616 in a BGP update message to node 606 even though node 606 is directly connected to node 602 on the RT in FIG. 6A because node 606 is not directly connected to node 602 on the FT in FIG. 6B.

When node 608 receives the BGP-LS-SPF Link NLRI in the BGP update message from node 602, node 608 determines, according to the FT in FIG. 6B, that node 606 is a peer node on the FT. Node 602 is also a peer node of node 608 on the FT, but is excluded because the BGP-LS-SPF Link NLRI was received from node 602. Node 608 sends the BGP-LS-SPF Link NLRI indicating the link change for link 616 in a BGP update message, as indicated by the arrows in FIG. 6A, to node 606 through the EBGP session between node 608 and node 606 over link 620.

Similarly, when node 604 receives the BGP-LS-SPF Link NLRI in the BGP update message from node 602, node 604 determines, according to the FT in FIG. 6B, that node 606 is a peer node on the FT. Node 602 is also a peer node of node 604 on the FT, but is excluded because the BGP-LS-SPF Link NLRI was received from node 602. Node 604 sends the BGP-LS-SPF Link NLRI indicating the link change for link 616 in a BGP update message, as indicated by the arrows in FIG. 6A, to node 606 through the EBGP session between node 604 and node 606 over link 618.

Thus, node 606 receives two copies of the BGP-LS-SPF Link NLRI indicating the link change for link 616. One copy is redundant. Further, when node 606 receives the BGP-LS-SPF Link NLRI indicating the link change for link 616 from nodes 604 and 608, node 606 determines, according to the FT in FIG. 6B, that nodes 604 and 608 are peer nodes of node 606 on the FT. However, because the BGP-LS-SPF Link NLRI indicating the link change for link 616 was received from both nodes 604 and 608, node 606 does not send the BGP-LS-SPF Link NLRI to any node.

As is the case with the existing flooding process described in FIG. 2, the above flooding process is also initiated by node 608 when node 608 determines that link 616 is up (i.e., both nodes connected by a link will detect a link change and send out a BGP-LS-SPF Link NLRI indicating the link change). The BGP update messages containing the BGP-LS-SPF Link NLRI indicating the link change to link 616 initiated by node 608 are similarly transmitted by the nodes in BGP-SPF routing domain 600 using the reduce flooding process as described above. For simplicity reasons, the details of transmitting the BGP update messages containing the BGP-LS-SPF Link NLRI indicating the link change to link 616 initiated by node 608 are not repeated. Additionally, for simplicity reasons, the arrows for messages initiated by node 608 are not shown in FIG. 6A.

As shown in FIG. 6A, even though some nodes may receive redundant BGP-LS-SPF Link NLRI, the number of BGP-LS-SPF Link NLRI in BGP update messages flooded in the domain 600 is much less when implementing the reduce flooding process for a node connections BGP-SPF routing domain in comparison to the existing flooding process for a node connections BGP-SPF routing domain described in FIG. 2. Therefore, the performance and efficiency of a node connections BGP-SPF routing domain is improved using the reduce flooding procedure of FIG. 6A.

Figure 7:
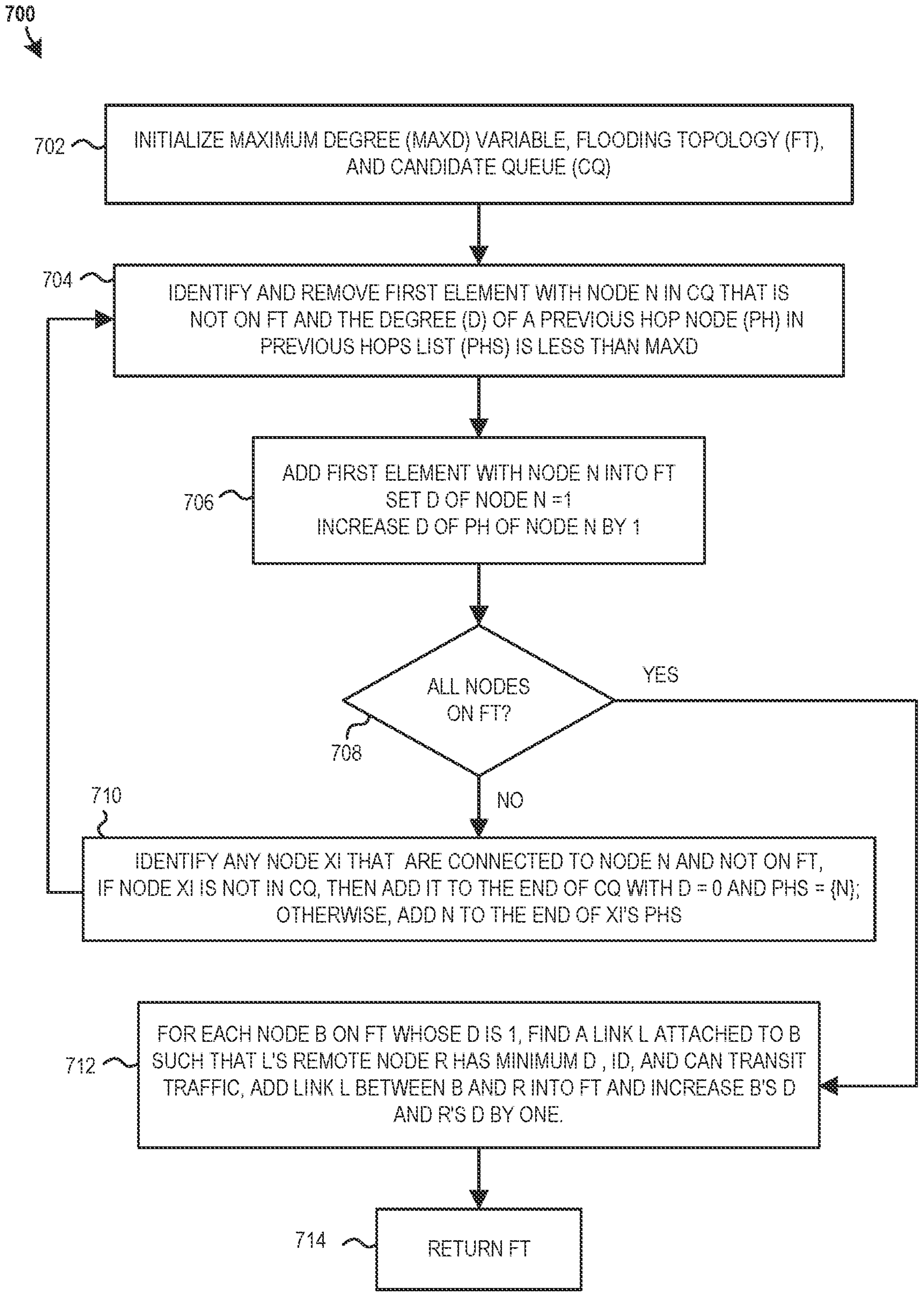
FIG. 7 is a flowchart illustrating an FT algorithm in accordance with an embodiment of the present disclosure.

FIG. 7 is a flowchart illustrating an FT algorithm 700 in accordance with an embodiment of the present disclosure. The FT algorithm 700 may be executed to compute an FT for a RT of a node connections BGP-SPF routing domain such as, but not limited to, the BGP-SPF routing domain 600 in FIG. 6A. As stated above, in various embodiments, every node in a node connections BGP-SPF routing domain may execute the FT algorithm 700 to compute an FT for the node connections BGP-SPF routing domain, or an elected leader node or one or more specially configured nodes may execute the FT algorithm 700 to compute an FT for a node connections BGP-SPF routing domain and share the computed FT with other nodes in the node connections BGP-SPF routing domain.

In the depicted embodiment, at step 702, the FT algorithm 700 includes instructions to initialize a maximum degree (MaxD) variable, and data structures for an FT and a candidate queue (CQ). A degree is a connection/link to a node on the FT. Thus, MaxD indicates the maximum number of connections that a node on the FT can have to other nodes on the FT. A reason for limiting the maximum number of connections that a node on the FT can have to other nodes on the FT is that the number of links on the FT is a key factor for reducing the amount of LS flooding. In general, the smaller the number of links, the less the amount of LS flooding. In an embodiment, MaxD is set to an initial value 3. In an embodiment, if during execution, the FT algorithm 700 determines that an FT cannot be constructed with all the nodes of a RT based on the value of MaxD, the FT algorithm 700 includes instructions to increase the value of MaxD by 1 and restart the FT algorithm 700 to rebuild the FT from scratch using the increased value of MaxD.

In an embodiment, the FT and CQ data structures comprise node elements of form (N, D, PHs), where N represents a Node, D is the degree of node N, and PHs contains the Previous Hops of node N. The FT data structure stores the above information for nodes on the FT. The CQ data structure contains potential nodes (i.e., candidate nodes) that can be added to the FT. In an embodiment, the FT algorithm 700 begins with an initial empty FT data structure FT={ } and a CQ={(R0, D=0, PHs={ })}. In an embodiment, R0 is a node in the RT with the smallest node ID. Alternatively, R0 may be selected based on some other criteria. In an alternative embodiment, the FT algorithm 700 can simply start with R0 as a root node (i.e., starting node) of the FT (e.g., FT={(R0, D=0, PHs={ })}) and an initial candidate queue CQ containing the node elements of the nodes directly connected to R0 (e.g., CQ={(R1, D=0, PHs={R0}), (R2, D=0, PHs={R0}), . . . , (Rm, D=0, PHs={R0})}, where each of the nodes R1 to Rm have degree D=0 and is directly connected to R0 as indicated by Previous Hops PHs={R0}. In an embodiment, R1 to Rm are in increasing order by node IDs. Alternatively, the order of R1 to Rm may be based on a different factor.

In an embodiment, the FT algorithm 700 includes instructions to implement a first loop comprising steps 704 to step 710 to add all nodes of the RT to the FT. At step 704, the FT algorithm 700 includes instructions to identify and remove the first node element with node N in CQ that is not on FT and one Previous Hop (PH) in PHs has a D less than MaxD. For instance, if FT={(R0, D=0, PHs={ })} and CQ={(R1, D=0, PHs={R0}), (R2, D=0, PHs={R0}), . . . , (Rm, D=0, PHs={R0}), then (R1, D=0, PHs={R0}) is removed from CQ because R1 is not on FT and R0's D=0, which is less than 3 (value of MaxD). As stated above, if no node element in CQ satisfies the above conditions of step 704, this means that an FT cannot be constructed with all the nodes of a RT using the value of MaxD, then the FT algorithm 700 includes instructions to increase the value of MaxD by 1 and restart the FT algorithm 700 to rebuild the FT from scratch using the increased value of MaxD (e.g., if MaxD is initially set to 3, then the first time no node element in CQ satisfies the above conditions, MaxD is increased to 4, and the FT algorithm 700 restarts construction of the FT from scratch to see if an FT can be constructed using the MaxD of 4, and if not, the FT algorithm 700 increases MaxD to 5, and restarts, and so on).

At step 706, the FT algorithm 700 includes instructions to add the first node element with node N into the FT, set D of node N=1, and increase D of PH of node N by 1. For example, adding the above node element (R0, D=0, PHs={R0}) that was removed from CQ to FT={(R0, D=0, PHs={ })} results in FT={(R0, 0, { }), (R1, 0, {R0})}. The D of node N, which is node element with R1 (or R1 node element for short) in this example, is set to 1, which results in FT={(R0, 0, { }), (R1, 1, {R0})}. Additionally, the D of PH of node N is increased by 1. The PH of R1 is R0 in this example. The D of R0 as shown above is 0. Therefore, the D of R0 is increased to 1, which results in FT={(R0, 1, { }), (R1, 1, {R0})}. Thus, the FT currently has two nodes R0 and R1, and there is a link between R0 and R1.

At step 708, the FT algorithm 700 includes instructions to determine whether all the nodes of the RT are on the FT. In an embodiment, the FT algorithm 700 determines that all the nodes of the RT are on the FT when CQ is empty and that all the nodes of the RT are not on the FT when the CQ is not empty.

When the FT algorithm 700 determines that all the nodes of the RT are not on the FT, at step 710, the FT algorithm 700 includes instructions to identify any node that are connected to node N and not on the FT (represented as node Xi, where (i=1, 2, . . . , n) in FIG. 7). For example, node N is currently R1 as shown above. Thus, in this step, the FT algorithm 700 identifies any node Xi (i=1, 2, . . . , n) that are connected to R1 on the RT that are not on the FT. For any node Xi that is connected to R1 on the RT and is not on the FT, the FT algorithm 700 determines if the node Xi is in CQ, and if not in CQ, the FT algorithm 700 adds the node Xi to the end of CQ with D=0 and PHs={N}. For example, assume node X1 is connected to R1, is not on the FT, and is not in CQ, then the FT algorithm 700 adds (X1, 0, {R1}) to the end of CQ. If the node Xi is connected to R1 on the RT and is not on the FT, but is already in CQ, then the FT algorithm 700 adds node N to the end of the PHs of node Xi in CQ. The FT algorithm 700 then loops back to step 704 and identifies and removes the first node element with node N in CQ that is not on FT and one Previous Hop (PH) in PHs has a D less than MaxD. Using the above example, in this iteration of the loop, the FT algorithm 700 identifies and removes (R2, D=0, PHs={R0}) from the CQ and adds (R2, D=0, PHs={R0}) to FT as described above in step 706.

If at step 708, the FT algorithm 700 determines that all nodes of a RT are on the FT (i.e., CQ is empty), the FT algorithm 700 terminates the first loop, and implements a second loop at step 712 to add a link to any node in the FT that has a D equal to one (1) in the FT. For example, in an embodiment, at step 712, the FT algorithm 700 includes instructions to perform a for-loop for each node on FT whose D is 1 (referred to as a node B in FIG. 7). This means that each node B on FT currently links to only one other node on the FT (i.e., are single link nodes). For each node B, the FT algorithm 700 includes instructions to find a link (referred to as link L) attached to the node B such that a remote node (referred to as node R) attached to the link L has a minimum D, a minimum node ID, and supports transit (i.e., the forwarding of non-local traffic with respect to BGP SPF). A BGP-LS-SPF Node NLRI Attribute SPF Status TLV defined in IETF document "BGP Link-State Shortest Path First (SPF) Routing" by K. Patel, et al., published Feb. 15, 2022, has a BGP Status that indicates whether a node supports transit. A BGP Status of value 2 indicates that a node does not support transit with respect to BGP SPF. If there is no such node R that supports transit, the FT algorithm 700 includes instructions to find a link L attached to the node B such that the node R of link L has a minimum D and a minimum node ID. For example, if there are 5 links attached to node B on the RT, the FT algorithm 700 identifies which of the remote nodes (i.e., node R) connected to the 5 links (excluding the link already on the FT) has a minimum D, a minimum node ID, and supports transit. For example, a node R connected to a link of node B with a D=1 would have a minimum D because all nodes on the FT have at least one link. If this is the only node R connected to node B with D=1, the link from node B to this node R is selected. If this is not the only node R connected to node B with D=1, then the link from node B to whichever node R that has D=1, has the minimum node ID, and supports transit is selected. The FT algorithm 700 adds the selected link between the node B and the node R into FT. The FT algorithm 700 increases the D value of both node B and node R in FT to indicate the added connection for both nodes. Once the FT algorithm 700 performs step 712 for each node B on FT, the FT is complete, and the FT algorithm 700, at step 714, returns the FT (i.e., outputs the determined FT).

With reference now to FIG. 8 through FIG. 14, the present disclosure describes various new BGP extensions that may be included in a BGP update message for implementing flooding reduction for a BGP-SPF routing domain under the RR model, node connections model, and directly-connected node model as described above in reference to FIG. 3 through FIG. 6B.

Figure 8:
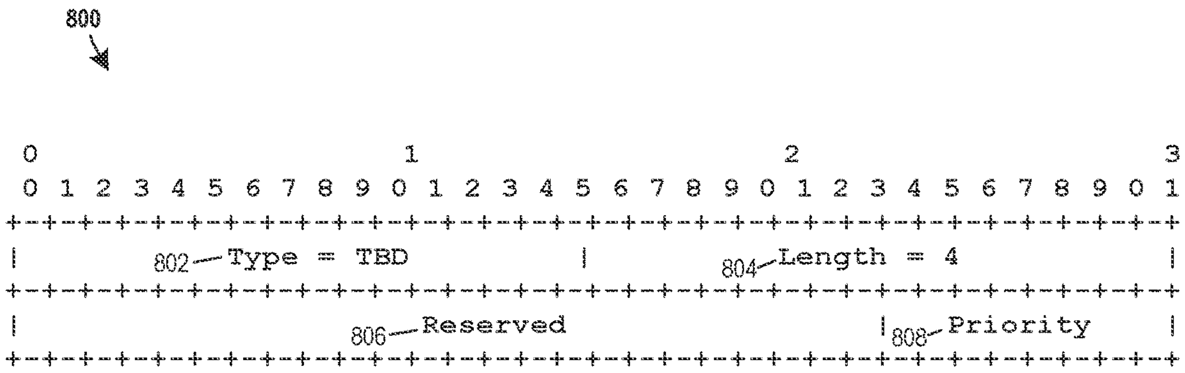
FIG. 8 is a schematic diagram of a Leader Priority TLV in accordance with an embodiment of the present disclosure.

FIG. 8 is a schematic diagram of a Leader Priority TLV 800 in accordance with an embodiment of the present disclosure. In some embodiments, under the RR model, the Leader Priority TLV 800 may be used by a RR to advertise the priority of the RR to become a leader RR of a BGP-SPF routing domain. In an embodiment, every RR in a BGP-SPF routing domain advertises the priority of the RR for becoming a leader RR using the Leader Priority TLV 800.

The Leader Priority TLV 800 includes a Type field 802, a Length field 804, a Reserved field 806, and a Priority field 808. The Type field 802 is a 2-byte field that specifies a type value indicating that the TLV is a Leader Priority TLV. The type value is to be decided (TBD) and assigned by the Internet Assigned Numbers Authority (IANA). The Length field 804 is a 2-byte field that specifies a length value of 4 indicating the number of bytes that the Leader Priority TLV 800 uses after the Length field 804 (i.e., the size of the VALUE part of the Leader Priority TLV 800, which comprises the Reserved field 806 and the Priority field 808). The Reserved field 806 is a 3-byte field that is currently not used and is set to zero in transmission. The Reserved field 806 should be ignored on reception. The Priority field 808 is a 1-byte field that specifies a priority value that indicates a priority of the RR to become a leader RR of a BGP-SPF routing domain. In an embodiment, the priority value is an unsigned integer from 0 to 255 in one octet indicating the priority of the RR to become a leader RR. The leader RR is the RR with the highest priority to become a leader in the domain. In an embodiment, when there are more than one RRs having the same highest priority, the RR with the highest Node ID and the highest priority is the leader RR in the domain.

Figure 9:
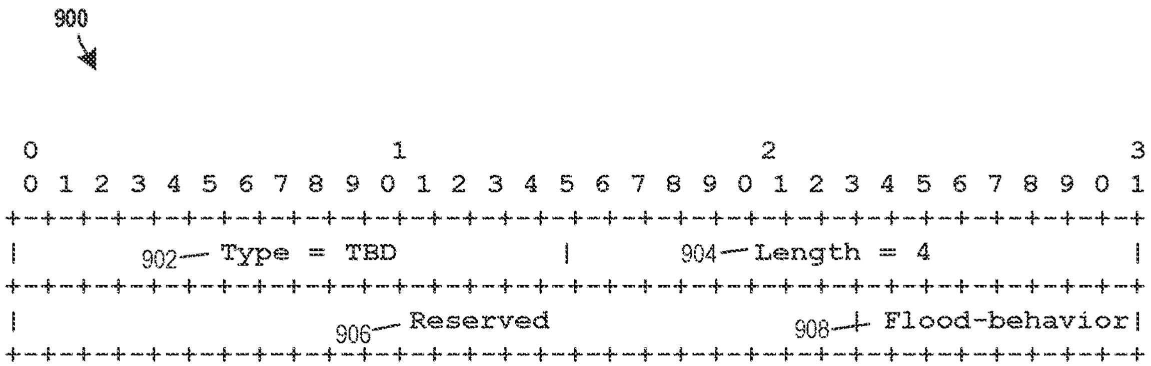
FIG. 9 is a schematic diagram of a Node Flood TLV in accordance with an embodiment of the present disclosure.

FIG. 9 is a schematic diagram of a Node Flood TLV 900 in accordance with an embodiment of the present disclosure. In some embodiments, the Node Flood TLV 900 may be used by a RR or controller to provide flooding behavior instructions to one or more nodes for reducing flooding in BGP-SPF domain.

The Node Flood TLV 900 includes a Type field 902, a Length field 904, a Reserved field 906, and a Flood-behavior field 908. The Type field 902 is a 2-byte field that specifies a type value indicating that the TLV is a Node Flood TLV. The type value is TBD. The Length field 904 is a 2-byte field that specifies a length value of 4 indicating the number of bytes in the Node Flood TLV 900 after the Length field 904. The Reserved field 906 is a 3-byte field that is currently not used and is set to zero in transmission. The Reserved field 906 should be ignored on reception. The Flood-behavior field 908 is a 1-byte field that specifies a flooding behavior value that indicates for a particular flooding behavior for a node. The following flooding behavior values and corresponding flooding behavior are defined.

0: Reserved.

1: send link states to the RR with the minimum ID

2: send link states to the RR with the maximum ID

3: send link states to 2 RRs with smaller IDs

4: send link states to 2 RRs with larger IDs

5: Balanced groups

6: balanced groups with redundancy of 2

7-127: Standardized flooding behaviors to be defined for RR Model 128-254: Private flooding behaviors to be defined for RR Model.

As discussed above, a leader RR may be elected for a BGP-SPF routing domain based on the priority of the RR for becoming a leader (e.g., as advertised using the Leader Priority TLV 800 in FIG. 8). In an embodiment, the flooding behavior for every node is configured on the leader RR and the leader RR advertises the behavior to the other RRs and/or every node in the network using the Node Flood TLV 900. For example, in an embodiment, the Node Flood TLV 900 may be used to instruct every node in the network or BGP-SPF routing domain to send the link states of the nodes to only one RR by setting the Flood-behavior field 908 in the Node Flood TLV 900 to 1, which instructs every node to send the link states of the node to the RR with the minimum ID. In another example, a RR can be configured to instruct every node in the network to send its link states to two RRs for redundancy by advertising the behavior to every node using the Node Flood TLV 900 with the Flood-behavior field 908 set to 3, which instructs every node to send the link states of the node to the two RRs with smaller IDs (i.e., the RR with the minimum ID and the RR with the second minimum ID). Additionally, when traffic balancing among RRs or controllers through dividing the nodes into groups and letting each group send their link states to a RR is desired, this flooding behavior is configured on a RR and the RR advertises the flooding behavior to every node using the Node Flood TLV 900 with the Flood-behavior field 908 set to 5, which instructs every node to divide the nodes in the network into a number of groups. A node in a group sends the link states of the node to the RR or RRs designated to the group.

Figure 10:
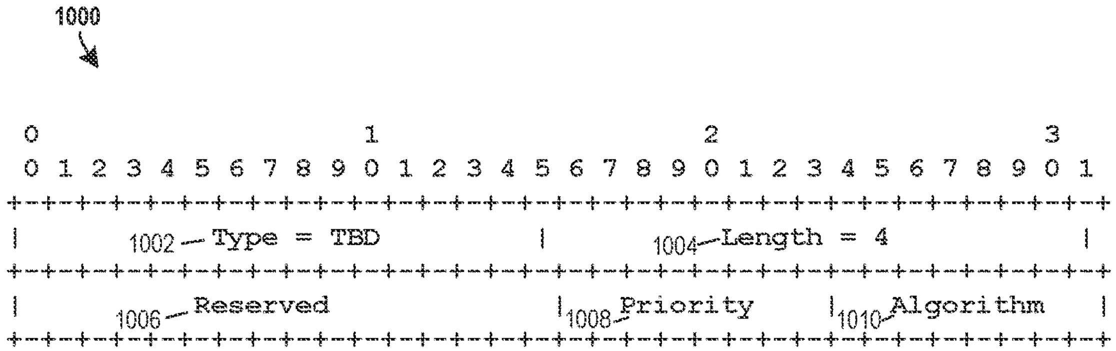
FIG. 10 is a schematic diagram of a Leader Preference TLV in accordance with an embodiment of the present disclosure.

FIG. 10 is a schematic diagram of a Leader Preference TLV 1000 in accordance with an embodiment of the present disclosure. In an embodiment, the Leader Preference TLV 1000 may be used by a BGP-SPF node to indicate the priority of the BGP-SPF node for becoming a leader of a BGP-SPF domain that implements a node connections model or a directly-connected node model as described above. In some embodiments, when FT computation is performed using a centralized mode as described above, a BGP-SPF node that is elected a leader may use the Leader Preference TLV 1000 to advertise an indication that an FT is computed by the leader to every BGP-SPF node in the BGP-SPF domain for implementing a reduce flooding process, such as, but not limited to, the reduce flooding process described in FIG. 6A. Additionally, in some embodiments, when FT computation is performed using a distributed mode as described above, where every BGP-SPF node in the BGP-SPF domain computes an FT for the BGP-SPF domain using a same algorithm, and there is no distribution of the FT, a leader may use the Leader Preference TLV 1000 to instruct every BGP-SPF node in the BGP-SPF domain to use a particular algorithm to compute an FT for the BGP-SPF domain. In some embodiments, if a BGP-SPF node does not advertise its Leader Preference TLV 1000, the BGP-SPF node is not eligible to become a leader.

In the depicted embodiment, the Leader Preference TLV 1000 includes a Type field 1002, a Length field 1004, a Reserved field 1006, a Priority field 1008, and an Algorithm field 1010. The Type field 1002 is a 2-byte field that specifies a type value indicating that the TLV is a Leader Preference TLV. The type value is TBD. The Length field 1004 is a 2-byte field that specifies a length value of 4 indicating the number of bytes in the Leader Preference TLV 1000 after the Length field 1004. The Reserved field 1006 is a 2-byte field that is currently not used and is set to zero in transmission. The Reserved field 1006 should be ignored on reception. The Priority field 1008 is a 1-byte field that specifies a priority value that indicates a priority of a BGP-SPF node to become a leader of a BGP-SPF routing domain. In an embodiment, the priority value is an unsigned integer from 0 to 255 in one byte indicating the priority of the BGP-SPF node to become a leader BGP-SPF node. In an embodiment, the leader is the BGP-SPF node with the highest priority specified in the Priority field 1008. In an embodiment, when there are more than one BGP-SPF nodes having the same highest priority, the BGP-SPF node with the highest Node ID and the highest priority is the leader. The Algorithm field 1010 is a 1-byte field that can specify whether the FT is computed by the leader (i.e., centralized mode), computed by each node (i.e., distributed mode), and if distributed, what algorithm to use to compute the FT. For example, in an embodiment, the Algorithm field 1010 may specify a numeric identifier in the range 0-254, where 0 indicates centralized FT computation by the leader, values 1-127 indicate distributed FT computation using a particular standardized distributed algorithm, and values 128-254 indicate distributed FT computation using a particular private distributed algorithm.

Figure 11:
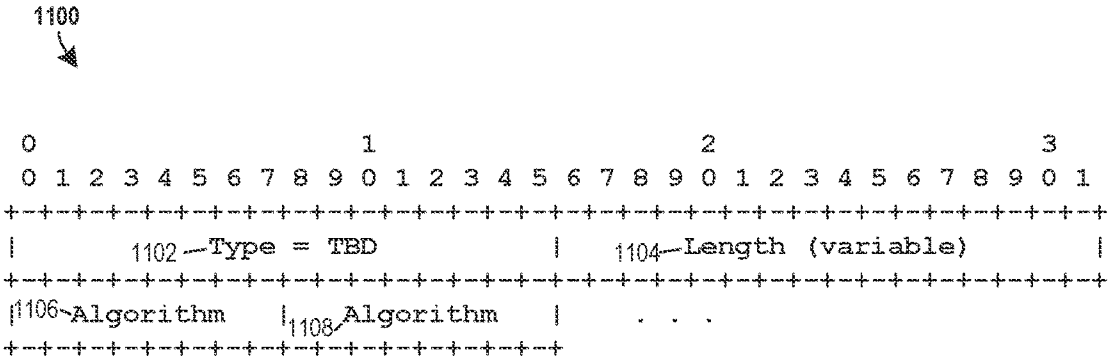
FIG. 11 is a schematic diagram of an Algorithm Support TLV in accordance with an embodiment of the present disclosure.

FIG. 11 is a schematic diagram of an Algorithm Support TLV 1100 in accordance with an embodiment of the present disclosure. In an embodiment, a BGP-SPF node in a node connections BGP-SPF domain uses the Algorithm Support TLV 1100 to indicate the algorithms that the BGP-SPF node supports for distributed FT computation.

In the depicted embodiment, the Algorithm Support TLV 1100 includes a Type field 1102, a Length field 1104, an Algorithm field 1106, and an Algorithm field 1108. The Type field 1102 is a 2-byte field that specifies a type value indicating that the TLV is an Algorithm Support TLV. The type value is TBD. The Length field 1104 is a 2-byte field that specifies a length value indicating the number of bytes in the Algorithm Support TLV 1100 after the Length field 1104. The length value varies based on the number algorithms the BGP-SPF node supports for computing an FT. For example, if the BGP-SPF node only supports two algorithms for computing an FT as shown in FIG. 11, the length value is 2 because each algorithm is specified in a 1 byte field. Assuming the BGP-SPF node supports distributed FT computation, the Algorithm field 1106 specifies a first numeric identifier in the range 1-255 indicating a first algorithm that the BGP-SPF node supports for computing an FT. If the BGP-SPF node supports a second algorithm for computing an FT, the Algorithm field 1108 specifies a second numeric identifier in the range 1-255 indicating the second algorithm that the BGP-SPF node supports for computing an FT. If the BGP-SPF node supports additional algorithms for computing an FT, additional Algorithm fields are added to the Algorithm Support TLV 1100 to indicate the additional algorithms supported by the BGP-SPF node for computing an FT.

Figure 12:
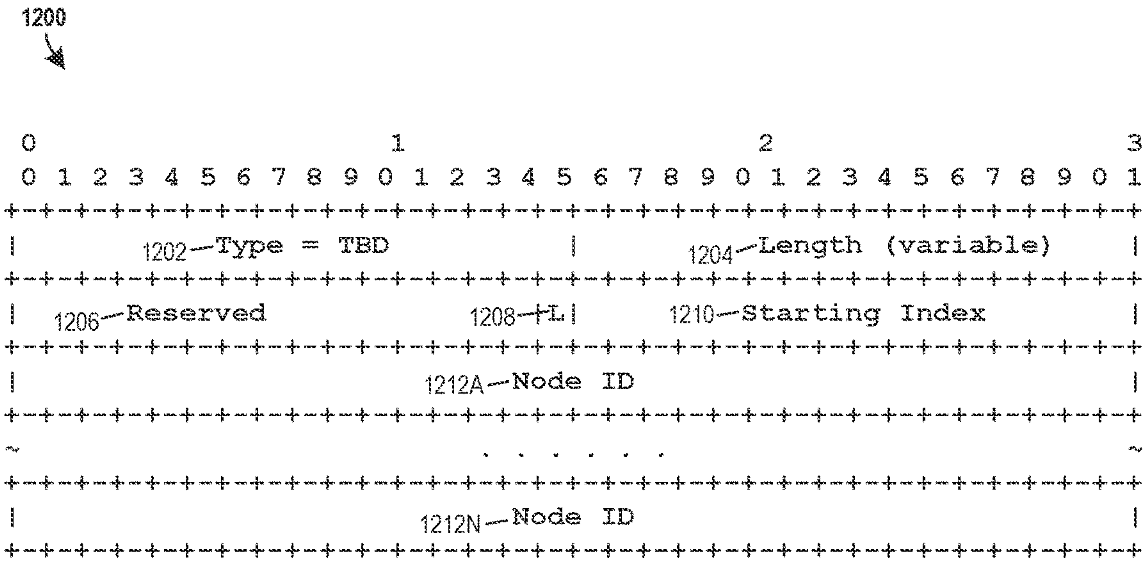
FIG. 12 is a schematic diagram of a Node IDs TLV in accordance with an embodiment of the present disclosure.

FIG. 12 is a schematic diagram of a Node IDs TLV 1200 in accordance with an embodiment of the present disclosure. In an embodiment, when centralized FT mode is enabled, a leader node of a node connections BGP-SPF domain uses the Node IDs TLV 1200 to indicate a mapping from nodes to their indexes. In an embodiment, the Node IDs TLV 1200 is encoded in MP_REACH_NLRI path attribute of a BGP update message and advertised to all nodes in the BGP-SPF domain. The mapping information in the Node IDs TLV 1200 enables the leader node to reduce the encoding size of the computed FT because the FT can be encoded using an index assigned to a node (i.e., a node index) instead of a node ID. For instance, as described below, the Node IDs TLV 1200 enables a mapping between a 2-byte node index to a 4-byte node ID. Thus, the leader node can substantially reduce the encoding size of an FT by using 2-byte node index to represent a node instead of a 4-byte node ID in the FT. The leader node distributes the Node IDs TLV 1200 to every node that receives the computed FT from the leader so that the nodes can decode the computed FT and use the FT to reduce distribution of link state information as disclosed herein. Additionally, in some embodiments, the Node IDs TLV 1200 may be modified to map a 2-byte node index to a 6-byte node ID, which further increases the benefit of using the node index to encode a computed FT.

In the depicted embodiment, the Node IDs TLV 1200 includes a Type field 1202, a Length field 1204, a Reserved field 1206, a Last (L) field 1208, a Starting index field 1210, and Node ID fields 1212A-1212N, where A is the first node in the Node IDs TLV 1200 and N is the last node in the Node IDs TLV 1200. The Type field 1202 is a 2-byte field that specifies a type value indicating that the TLV is a Node IDs TLV. The type value is TBD. The Length field 1204 is a 2-byte field that specifies a length value indicating the number of bytes in the Node IDs TLV 1200 after the Length field 1204. The length value varies based on the number nodes in the Node IDs TLV. The Reserved field 1206 is a 17-bit field that is currently not used and is set to zero in transmission. The Reserved field 1206 should be ignored on reception. The L field 1208 is a 1-bit field following the Reserved field 1206. In an embodiment, the L field 1208 is set (i.e., set to 1) when the index of the last node ID specified in Node ID field 1212N in the Node IDs TLV 1200 is equal to the last index in the full list of node IDs for the BFP-SPF domain. In other words, when the L field 1208 is set, a node that receives the Node IDs TLV 1200 can initiate decoding the FT because the node has received the last of the node mapping information needed to decode the entire FT.

The Starting index field 1210 specifies the index of the first node ID specified in the Node ID field 1212A of the Node IDs TLV 1200. Node ID fields 1212A-1212N specify the BGP identifier, also referred to as the BGP Router-ID, of a node in the BGP-SPF domain.

The index of the other nodes listed in Node ID field 1212B (not shown) to Node ID field 1212N are not encoded in the Node IDs TLV 1200. Instead, to determine the index of the other nodes in the Node IDs TLV 1200, a node simply increments the value specified in Starting index field 1210 to obtain the index of the nodes listed in Node ID field 1212B to Node ID field 1212N. For example, if the value specified in Starting index field 1210 happens to be 100, then the index of the node specified in specified in the Node ID field 1212A is 100, the index of the node specified in the Node ID field 1212B is 101, the index of the node specified in the Node ID field 1212C (not shown) is 102, and so on.

Figure 13:
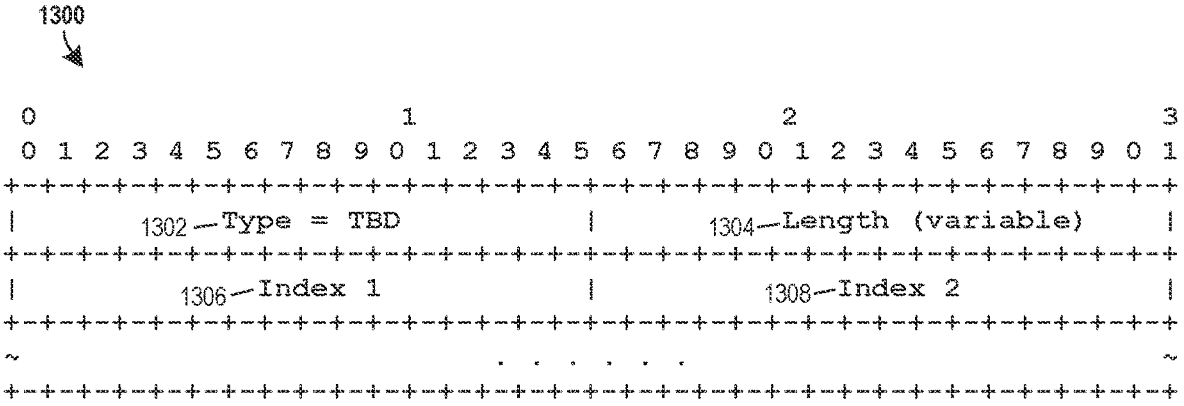
FIG. 13 is a schematic diagram of a Paths TLV in accordance with an embodiment of the present disclosure.

FIG. 13 is a schematic diagram of a Paths TLV 1300 in accordance with an embodiment of the present disclosure. In an embodiment, when centralized FT mode is enabled, a leader node of a node connections BGP-SPF domain uses the Paths TLV 1300 to advertise a part (i.e., one or more paths) of the computed FT. In the Paths TLV 1300, a path is encoded as a sequence of indices: (Index 1, Index 2, Index 3, . . . ), denoting a link/connection from the node with index 1 to the node with index 2, a link/connection from the node with index 2 to the node with index 3, and so on. At a minimum, a single link/connection is a simple case of a path that only connects two nodes. Thus, the Paths TLV 1300 at a minimum would include two node index fields as shown in FIG. 13. However, the length of a path varies and may connect many nodes. Thus, the Paths TLV 1300 usually includes additional index fields. For instance, in the depicted embodiment, the Paths TLV 1300 includes a Type field 1302, a Length field 1304, an Index 1 field 1306, an Index 2 field 1308, and may contain additional Index fields as needed. The Type field 1302 is a 2-byte field that specifies a type value indicating that the TLV is a Paths TLV. The type value is TBD. The Length field 1304 is a 2-byte field that specifies a length value indicating the number of bytes in the Paths TLV 1300 after the Length field 1304. The length value varies based on the number of paths and the length of the paths (i.e., number of nodes in a path) encoded in the Paths TLV 1300. The Index 1 field 1306 specifies the node index of a first node at the beginning of a path, the Index 2 field 1308 specifies the node index of a second node connected to the first node along the path, and so on. As stated above, more than one path may be encoded in one Paths TLV 1300. For instance, in an embodiment, each of the multiple paths is represented as a sequence of indices of the nodes on the path, and different paths (e.g., two sequences of indices for the two paths) are separated by a special index value such as 0xFFFF specified in an Index field between the two sequences of indices in the Paths TLV 1300. In this case, the Length field has a value of 2*(number of indices in N paths+N−1).

When there are a number of single link paths (e.g., N single link paths), using one paths TLV to present them is more efficient than using N paths TLVs to present them, where each Paths TLV 1300 encodes a single link path. Using one TLV consumes 4+6*(N−1)+4=6*N+2 bytes. Using N TLVs occupies N*(4+4)=8*N bytes. The space used by the former is about ¾ (three quarters) of the space used by the latter when N is a big number such as 50.

Figure 14:
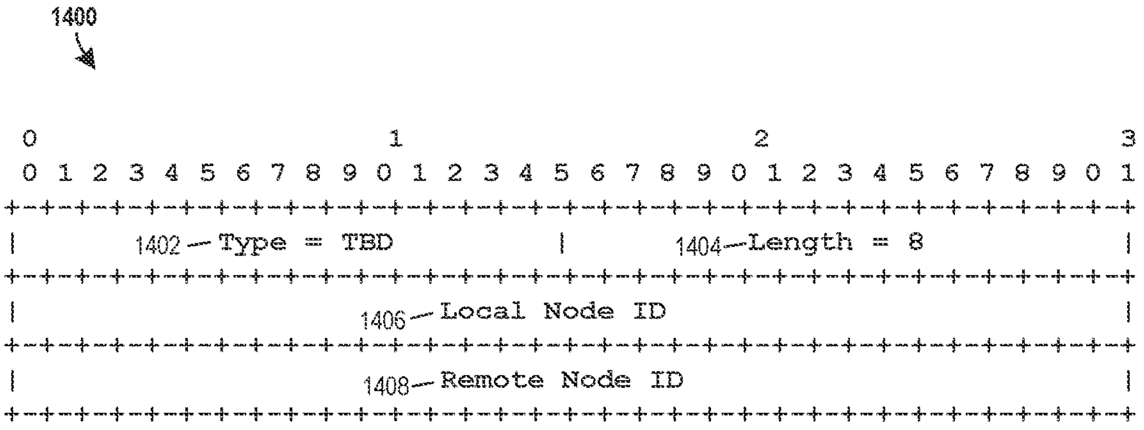
FIG. 14 is a schematic diagram of a Connection Used for Flooding (CUF) TLV in accordance with an embodiment of the present disclosure.

FIG. 14 is a schematic diagram of a Connection Used for Flooding (CUF) TLV 1400 in accordance with an embodiment of the present disclosure. In the depicted embodiment, the CUF TLV 1400 includes a Type field 1402, a Length field 1404, a Local Node ID field 1406, and a Remote Node ID 1408. The Type field 1402 is a 2-byte field that specifies a type value indicating that the TLV is a CUF TLV. The type value is TBD. The Length field 1404 is a 2-byte field that specifies a length value of 8 indicating the number of bytes in the CUF TLV 1400 after the Length field 1404. The Local Node ID field 1406 is a 4-byte field that specifies the BGP ID of the local node of the session over the connection on the FT that is used for flooding link states. The Remote Node ID 1408 is a 4-byte field that specifies the BGP ID of the remote node of the session over the connection on the FT that is used for flooding link states In an embodiment, a node uses the CUF TLV 1400 to indicate that a connection/link is a part of the FT, is used for flooding, and a session over the connection/link has the node's (local) node ID and the remote node ID. The node sends the CUF TLV 1400 to every node in the BGP-SPF domain. A node that receives the CUF TLV 1400 can verify that the connection specified in the CUF TLV 1400 is on the FT to ensure that the FT stored and used by the receiving node is accurate and has not changed.

Figure 15:
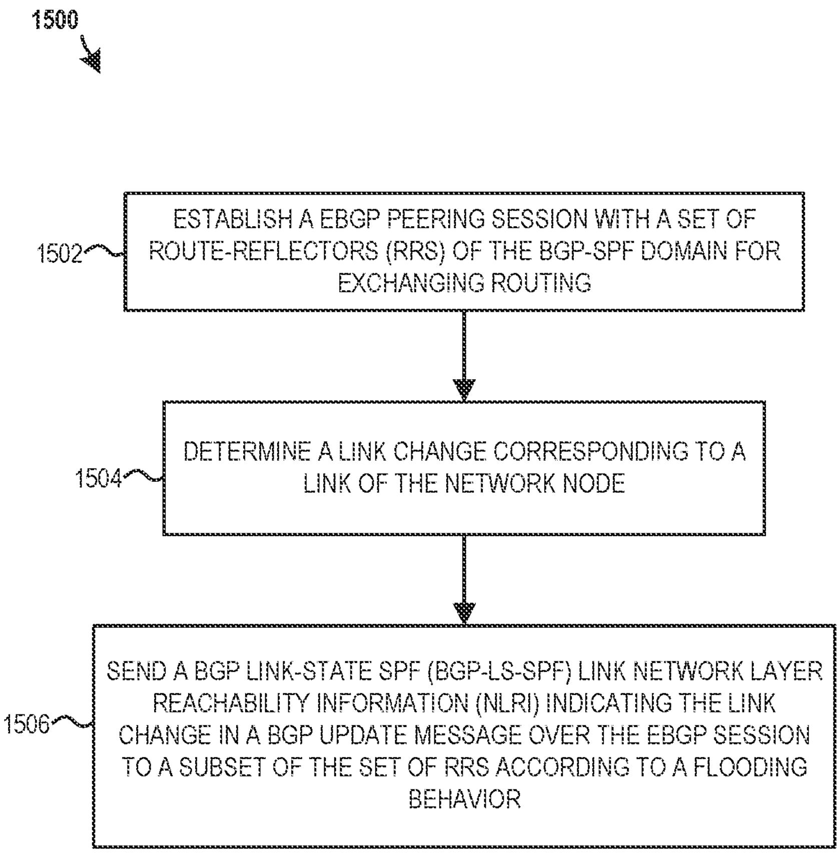
FIG. 15 is a flowchart illustrating a method performed by a network node in a BGP-SPF domain for reducing flooding in the BGP-SPF domain in accordance with an embodiment of the present disclosure.

FIG. 15 is a flowchart illustrating a method 1500 for reducing flooding in the BGP-SPF domain implemented by a network node in a BGP-SPF domain in accordance with an embodiment of the present disclosure. The method 1500 includes establishing, by the network node, an eBGP peering session with a set of RRs of the BGP-SPF domain for exchanging routing (block 1502). The network node determines a link change corresponding to a link of the network node (block 1504). The network node sends a BGP Link-State SPF (BGP-LS-SPF) Link Network Layer Reachability Information (NLRI) indicating the link change in a BGP update message over the eBGP session to a subset of the set of RRs according to a flooding behavior that determines which RRs are in the subset of the set of RRs (block 1506).

Additionally, as described above, in some embodiments, in communicating the information indicating the link change to the subset of the set of RRs, the network node may encode the information indicating the link change in a BGP-LS-SPF Link NLRI; encode a BGP update message comprising the BGP-LS-SPF Link NLRI; and communicate the BGP update message to the subset of the set of RRs. In some embodiments, the method 1500 may include receiving a flooding behavior instructions indicating the flooding behavior that determines which RRs are in the subset of the set of RRs; and configuring the flooding behavior on the network node. The method 1500 may also include receiving the flooding behavior instructions encoded in a Node Flood Type-Length-Value (TLV); and decoding the Node Flood TLV to determine the flooding behavior. The method 1500 may further include assigning the network node to a group network nodes in the BGP-SPF domain based on the flooding behavior instructions; and sending the BGP-LS-SPF Link NLRI indicating the link change to the subset of the set of RRs designated for the group.

Figure 16:
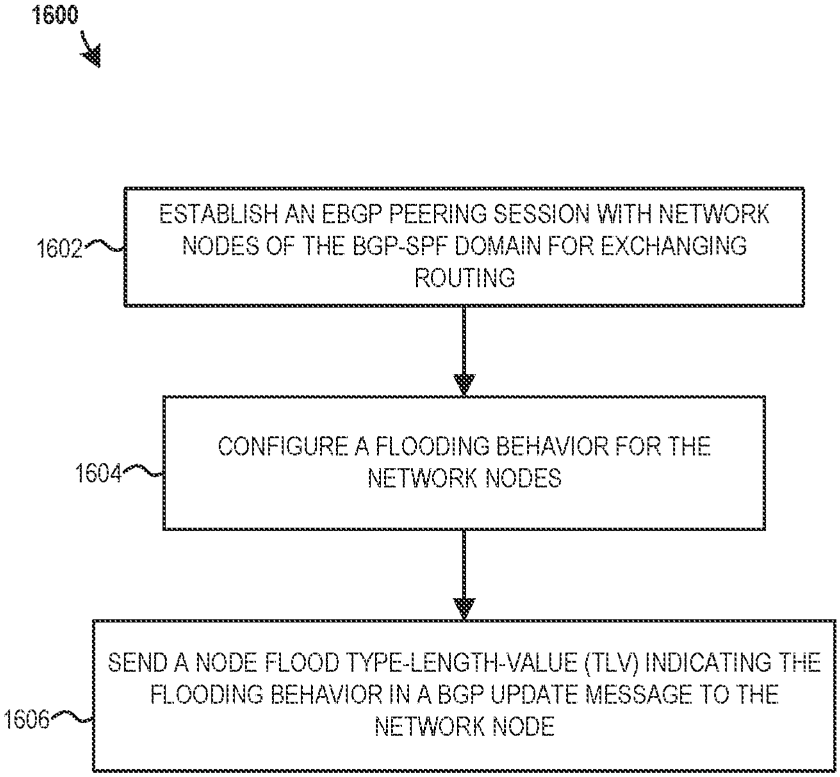
FIG. 16 is a flowchart illustrating a method that is performed by a RR in a BGP-SPF domain for reducing flooding in the BGP-SPF domain in accordance with an embodiment of the present disclosure.

FIG. 16 is a flowchart illustrating a method 1600 for reducing flooding in the BGP-SPF domain implemented by a RR in a BGP-SPF domain in accordance with an embodiment of the present disclosure. The method 1600 includes establishing, by the RR, eBGP peering session with network nodes of the BGP-SPF domain for exchanging routing (block 1602). The RR configures a flooding behavior for the network nodes (block 1604). The flooding behavior instructs the network nodes to send information indicating a link change to only particular RRs of the BGP-SPF routing domain. The RR sends a Node Flood Type-Length-Value (TLV) indicating the flooding behavior in a BGP update message to the network node (block 1606). As described above, the RR may encode the flooding behavior in the Node Flood TLV; encode a BGP update message comprising the Node Flood TLV; and communicate the BGP update message to the network nodes.

Additionally, as described above, in some embodiments, the method 1600 may include communicating a priority of the RR to become a leader of the BGP-SPF routing domain. The method 1600 may also include encoding a priority of the RR to become a leader of the BGP-SPF routing domain in a Leader Priority TLV; encoding a BGP update message comprising the Leader Priority TLV; and communicating the BGP update message to the network nodes and other RRs of the BGP-SPF routing domain. The method 1600 may further include receiving priorities of the other RRs of the BGP-SPF routing domain to become a leader; determining that the priority of the RR is a highest priority to become a leader of the BGP-SPF routing domain based on the priorities of the other RRs; and configuring the RR as the leader of the BGP-SPF routing domain.

Figure 17:
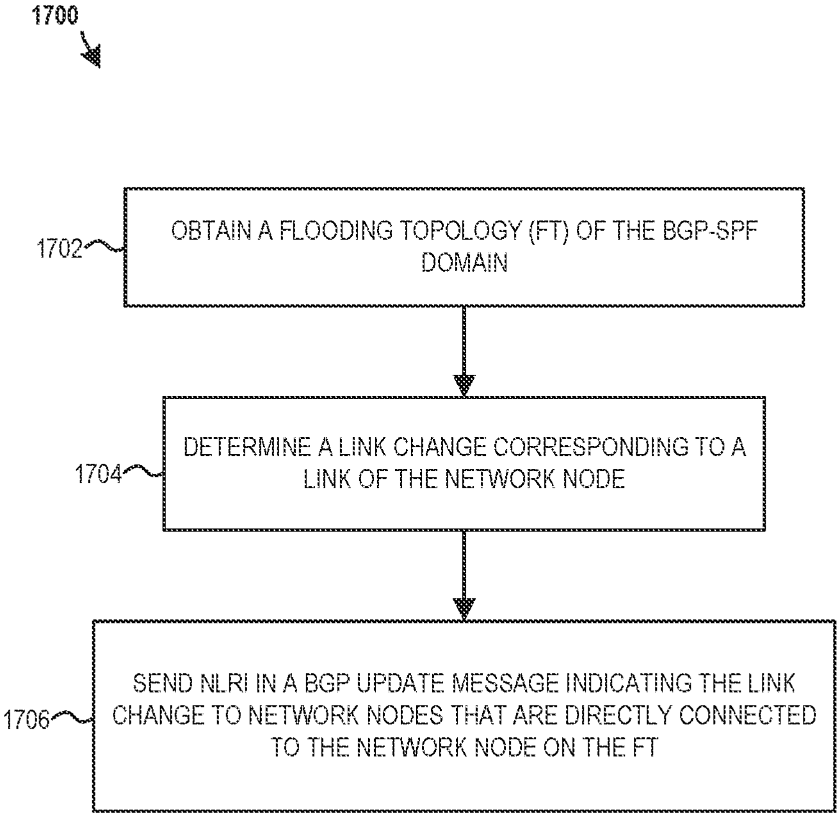
FIG. 17 is a flowchart of a method that is performed by a network node in a BGP-SPF domain for reducing flooding in the BGP-SPF domain in accordance with an embodiment of the present disclosure.

FIG. 17 is a flowchart of a method 1700 for reducing flooding in the BGP-SPF domain implemented by a network node in a BGP-SPF domain in accordance with an embodiment of the present disclosure. The method 1700 includes obtaining, by the network node, an FT of the BGP-SPF domain. (block 1702). The FT is a sub-network topology that connects all nodes of a RT of the BGP-SPF domain. The network node determines a link change corresponding to a link of the network node (block 1704). The network node sends NLRI in a BGP update message indicating the link change to network nodes that are directly connected to the network node on the FT (block 1706).

As described above, in some embodiments, the method 1700 may include obtaining the FT from a leader node of the BGP-SPF domain. The method 1700 may also include receiving a node index mapping from the leader node; and decoding an encoding of the FT using the node index mapping to obtain the FT. The method 1700 may further include receiving updates to the FT from the leader node; and modifying the FT based on the updates. The updates may include new connections encoded in a Paths TLV that is encoded in a Multiprotocol Reachable Link Network Layer Reachability Information (MP_REACH_NLRI) path attribute in a BGP update message. The updates may also include removed connections encoded in a Paths TLV that is encoded in a Multiprotocol UnReachable Link Network Layer Reachability Information (MP_REACH_NLRI) path attribute in a BGP update message.

Figure 18:
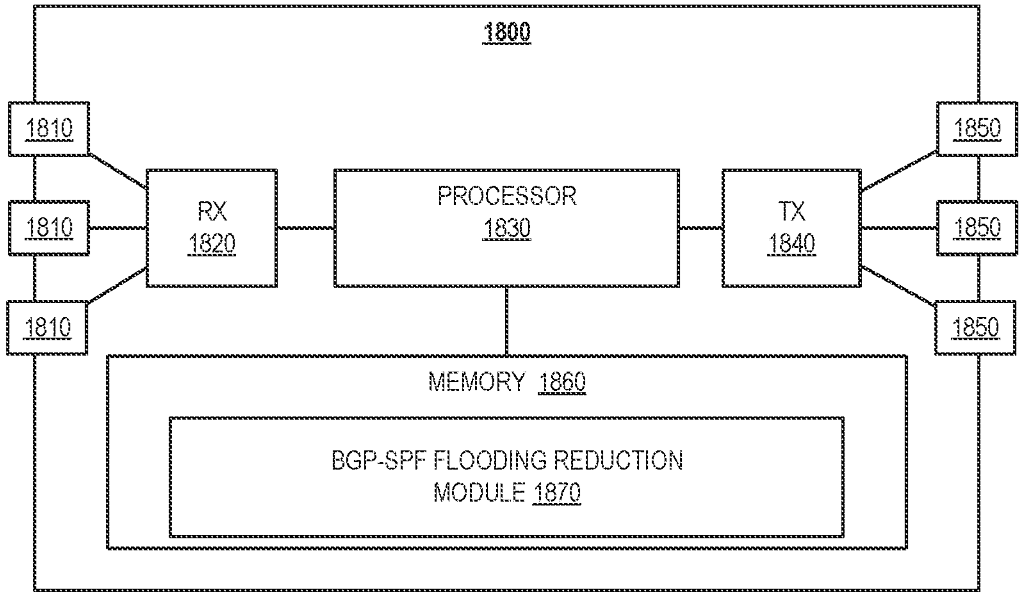
FIG. 18 is a schematic diagram of a network node in accordance with an embodiment of the present disclosure.

FIG. 18 is a schematic architecture diagram of an apparatus 1800 according to an embodiment of the disclosure. The apparatus 1800 is suitable for implementing the disclosed embodiments as described herein. For example, in an embodiment, a network node, router, or RR can be implemented using the apparatus 1800. In various embodiments, the apparatus 1800 can be deployed as a router, a switch, and/or other network nodes within a network.

The apparatus 1800 comprises receiver units (Rx) 1820 or receiving means for receiving data via ingress/input ports 1810; a processor 1830, logic unit, central processing unit (CPU) or other processing means to process instructions; transmitter units (TX) 1840 or transmitting means for transmitting via data egress/output ports 1850; and a memory 1860 or data storing means for storing the instructions and various data.

The processor 1830 may be implemented as one or more CPU chips, cores (e.g., as a multi-core processor), field-programmable gate arrays (FPGAs), application specific integrated circuits (ASICs), and digital signal processors (DSPs). The processor 1830 is communicatively coupled via a system bus with the ingress ports 1810, RX 1820, TX 1840, egress ports 1850, and memory 1860. The processor 1830 can be configured to execute instructions stored in memory 1860. Thus, the processor 1830 provides a means for determining, creating, indicating, performing, providing, or any other action corresponding to the claims when the appropriate instruction is executed by the processor 1830.

The memory 1860 can be any type of memory or component capable of storing data and/or instructions. For example, the memory 1860 may be volatile and/or non-volatile memory such as read-only memory (ROM), random access memory (RAM), ternary content-addressable memory (TCAM), and/or static random-access memory (SRAM). The memory 1860 can also include one or more disks, tape drives, and solid-state drives and may be used as an over-flow data storage device, to store programs when such programs are selected for execution, and to store instructions and data that are read during program execution. In some embodiments, the memory 1860 can be memory that is integrated with the processor 1830.

In one embodiment, the memory 1860 stores a BGP-SPF Flooding Reduction module 1870. The BGP-SPF Flooding Reduction module 1870 includes data and executable instructions for implementing the disclosed embodiments. For instance, the BGP-SPF Flooding Reduction module 1870 can include instructions for implementing the BGP-SPF Flooding Reduction as described herein. The inclusion of the BGP-SPF Flooding Reduction module 1870 substantially improves the functionality of the apparatus 1800 by reducing the amount of link-state messages that the apparatus 1800 both receives and transmits, and thereby increasing the efficiency of the apparatus 1800 as well as the overall network.

The disclosed embodiments may be a system, an apparatus, a method, and/or a computer program product at any possible technical detail level of integration. The computer program product may include a non-transitory computer readable storage medium (or media) having computer readable program instructions thereon for causing a processor to carry out aspects of the present disclosure. The computer readable storage medium may be a tangible device that can retain and store instructions for use by an instruction execution device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method, implemented by a network node, for reducing flooding in a Border Gateway Protocol-Shortest Path First (BGP-SPF) domain, the method comprising:

establishing an external BGP (eBGP) session with a set of route-reflectors (RRs) of the BGP-SPF domain for exchanging routing information;

determining a link change corresponding to a link of the network node; and sending a BGP Link-State SPF (BGP-LS-SPF) Link Network Layer Reachability Information (NLRI) indicating the link change in a BGP update message over the eBGP session to a subset of the set of RRs according to a flooding behavior that determines which RRs are in the subset of the set of RRs.

2. The method of claim 1, further comprising:

receiving flooding behavior instructions indicating the flooding behavior that determines which RRs are in the subset of the set of RRs; and configuring the flooding behavior on the network node.

3. The method of claim 2, further comprising receiving the flooding behavior instructions from a RR in the set of RRs, wherein the RR is a leader RR in the BGP-SPF domain.

4. The method of claim 2, further comprising:

receiving the flooding behavior instructions encoded in a Node Flood Type-Length-Value (TLV); and decoding the Node Flood TLV to determine the flooding behavior.

5. The method of claim 2, further comprising:

assigning the network node to a group of network nodes in the BGP-SPF domain based on the flooding behavior instructions; and communicating the BGP-LS-SPF Link NLRI indicating the link change to the subset of the set of RRs designated for the group.

6. A method, implemented by a route reflector (RR), for reducing flooding in a Border Gateway Protocol-Shortest Path First (BGP-SPF) domain, the method comprising:

establishing an external BGP (eBGP) session with network nodes of the BGP-SPF domain for exchanging routing information;

configuring a flooding behavior for the network nodes; and sending a BGP update message to the network nodes, wherein the BGP update message indicates the flooding behavior.

7. The method of claim 6, further comprising communicating a priority of the RR to become a leader of the BGP-SPF domain.

8. The method of claim 6, further comprising:

encoding a priority of the RR to become a leader of the BGP-SPF domain in a Leader Priority Type-Length-Value (TLV); and communicating the Leader Priority TLV to the network nodes and other RRs of the BGP-SPF domain.

9. The method of claim 6, further comprising:

receiving priorities of other RRs of the BGP-SPF domain to become a leader of the BGP-SPF domain;

determining that a priority of the RR is a highest priority relative to the priorities of the other RRs in the BGP-SPF domain; and configuring the RR as the leader of the BGP-SPF domain based on the determination.

10. The method of claim 6, wherein the flooding behavior instructs the network nodes to send information indicating a link change to only particular RRs of the BGP-SPF domain.

11. A method, implemented by a network node, for reducing flooding in a Border Gateway Protocol-Shortest Path First (BGP-SPF) domain, the method comprising:

obtaining a flooding topology (FT) of the BGP-SPF domain, wherein the FT is a sub-network topology that connects all nodes of a real network topology (RT) of the BGP-SPF domain;

determining a link change corresponding to a link of the network node; and sending a BGP update message to network nodes that are directly connected to the network node on the FT, wherein the BGP update message comprises Network Layer Reachability Information (NLRI) indicating the link change, and wherein obtaining the FT comprises:

selecting a node R0 from a network;

initializing the FT with a node element for the node R0, wherein the node element comprises a node, a number of node connections (D), a previous hops (PHs) list;

initializing a candidate queue (Cq) comprising node elements for each node directly connected to the node R0 on the network;

implementing a first loop comprising:

removing the node element of a first node from the candidate queue (Cg) and appending the node element to the FT, wherein the first node has the number of node connections (D) less than a maximum number of connections (MaxD);

determining whether the FT includes all nodes in the network;

identifying a set of nodes connected to the first node in the network that are not in the FT when the FT does not include all the nodes in the network, and appending nodes in the set of nodes that are not in the candidate queue (Cg) to the candidate queue (Cq), and appending the first node to the previous hops (PHs) list of the node element of nodes in the set of nodes that are in the candidate queue (Cq); and repeating the first loop until the FT includes all the nodes in the network; and adding a link to any node in the FT that has the number of node connections (D) equal to one (1).

12. The method of claim 11, further comprising:

obtaining the FT from a leader node of the BGP-SPF domain;

receiving a node index mapping from the leader node; and decoding an encoding of the FT using the node index mapping to obtain the FT.

13. The method of claim 12, further comprising:

receiving updates to the FT from the leader node, wherein the updates comprise at least one of new connections or removed connections; and modifying the FT based on the updates.

14. The method of claim 13, wherein the new connections are encoded in a first Paths Type-Length-Value (TLV), wherein the first Paths TLV is included in a Multiprotocol Reachable Link Network Layer Reachability Information (MP_REACH_NLRI) path attribute, wherein the removed connections are encoded in a second Paths TLV, and wherein the second Paths TLV is included in a Multiprotocol UnReachable Link Network Layer Reachability Information (MP_UNREACH_NLRI) path attribute.

15. The method of claim 11, wherein the first loop determines that FT does not include all nodes in the network when the candidate queue (Cq) is not empty, and determines that the FT includes all nodes in the network when the candidate queue (Cq) is empty.

16. The method of claim 11, wherein adding the link to any node in the FT that has the number of node connections (D) equal to one (1) in the FT comprises implementing a second loop, wherein the second loop comprises:

identifying a single link node in the FT, wherein the single link node has the number of node connections (D) equal to one (1) in the FT;

terminating the second loop when there is no single link node in the FT;

otherwise, identifying a set of links connected to the single link node in the network, wherein the set of links excludes an existing link of the single link node on the FT;

identifying a set of remote nodes connected to the set of links;

identifying a set of transit capable remote nodes in the set of remote nodes that can support transit;

identifying a second link in the set of links connected to a transit capable remote node in the set of transit capable remote nodes that has a minimum number of node connections and a minimum node identifier (ID);

identify the second link attached in the set of links connected to a remote node in the set of remote nodes that has the minimum number of node connections and the minimum node ID when there is no transit capable remote node in the set of transit capable remote nodes;

adding the second link into the FT;

increasing the number of node connections (D) of the single link node in the FT by one;

increasing the number of node connections (D) of the transit capable remote node or the remote node, when there is no transit capable remote node, in the FT by one; and repeating the second loop.

17. The method of claim 11, wherein the node RO has a lowest node identifier (ID) in the network.

18. The method of claim 11, wherein the candidate queue (Cq) is initialized with nodes ordered from lowest node identifier (ID) to highest node ID.

19. The method of claim 11, wherein nodes appended to the candidate queue (Cq) are ordered from lowest node identifier (ID) to highest node ID.

* * * * *